Figure 1:
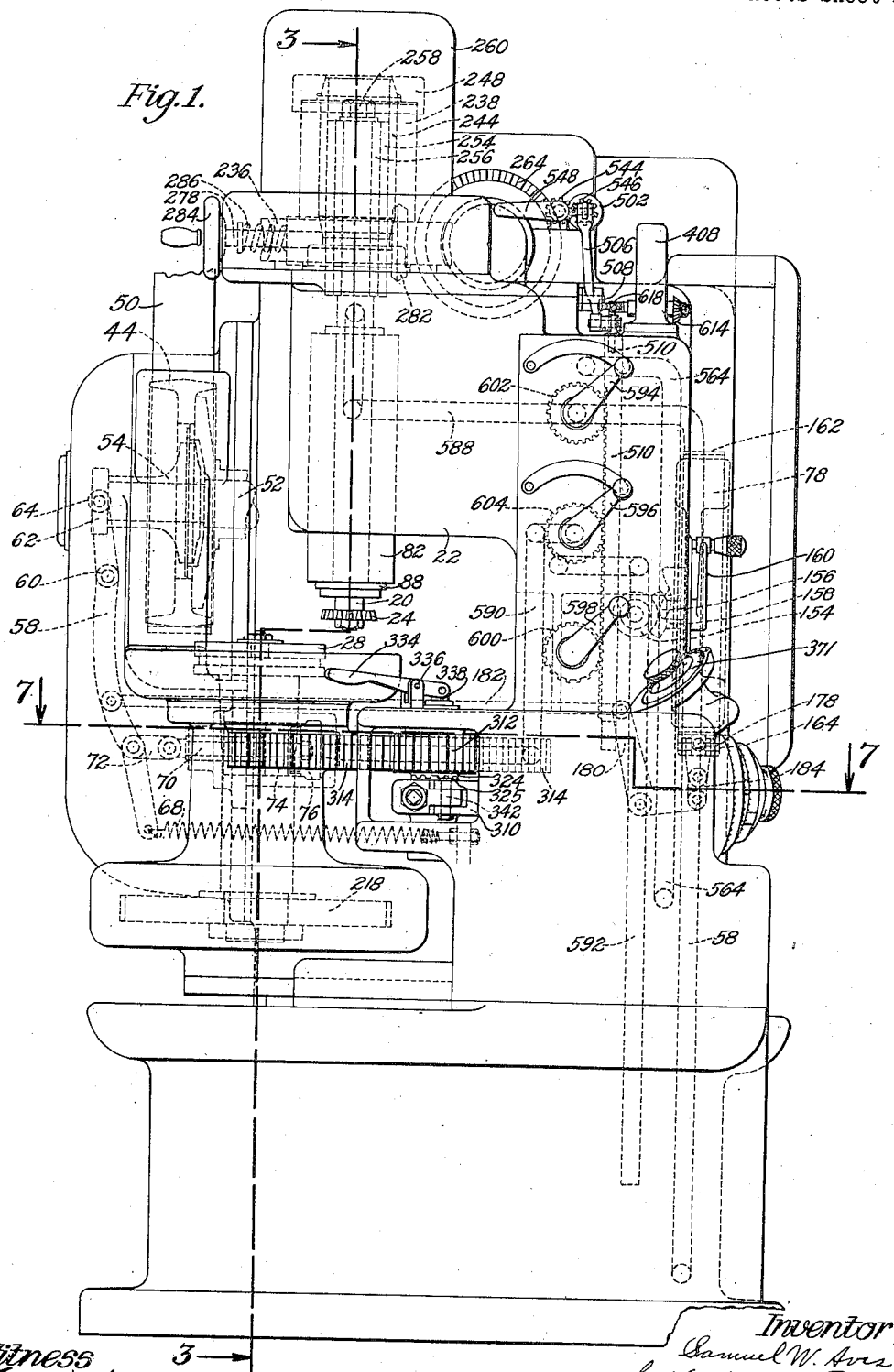

Dec. 24, 1935.  S. W. AVIS  2,025,034
GEAR CUTTING MACHINE
Filed June 23, 1931  10 Sheets-Sheet 2

Witness
F. A. Wright

Inventor
Samuel W. Avis
by Van Everen Fish
Hildreth Heavy Atty.

Dec. 24, 1935.     S. W. AVIS     2,025,034
GEAR CUTTING MACHINE
Filed June 23, 1931    10 Sheets-Sheet 3

Witness
F. A. Wright

Inventor
Samuel W. Avis
by VanEvera Frisk
Hildreth & Cary Attys.

Dec. 24, 1935.  S. W. AVIS  2,025,034
GEAR CUTTING MACHINE
Filed June 23, 1931    10 Sheets-Sheet 5
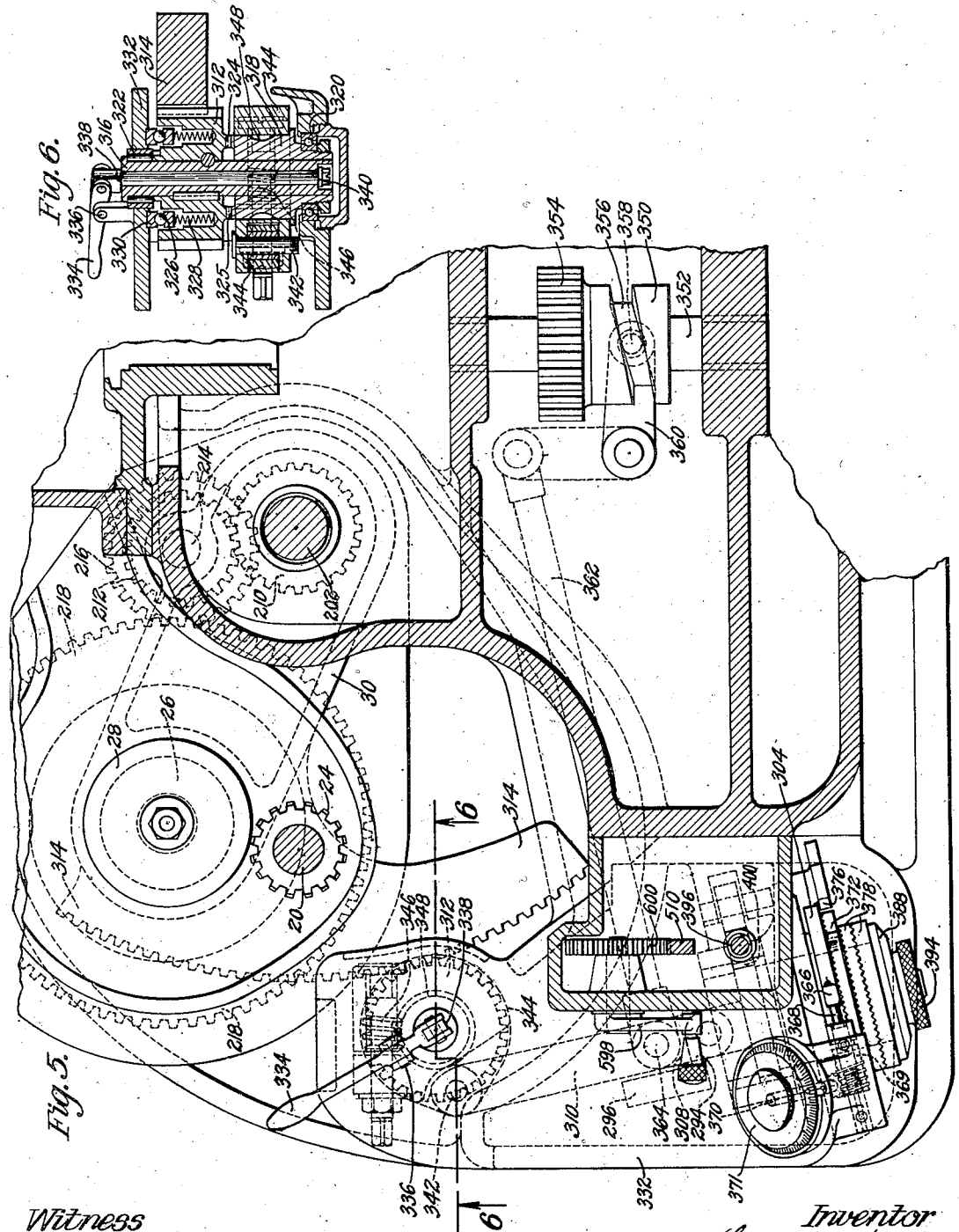
Witness
F. A. Wright
Inventor
Samuel W. Avis
by Van Everen Fish
Hildreth Heary Attys Dec. 24, 1935.　　　　S. W. AVIS　　　　2,025,034
GEAR CUTTING MACHINE
Filed June 23, 1931　　　10 Sheets-Sheet 6

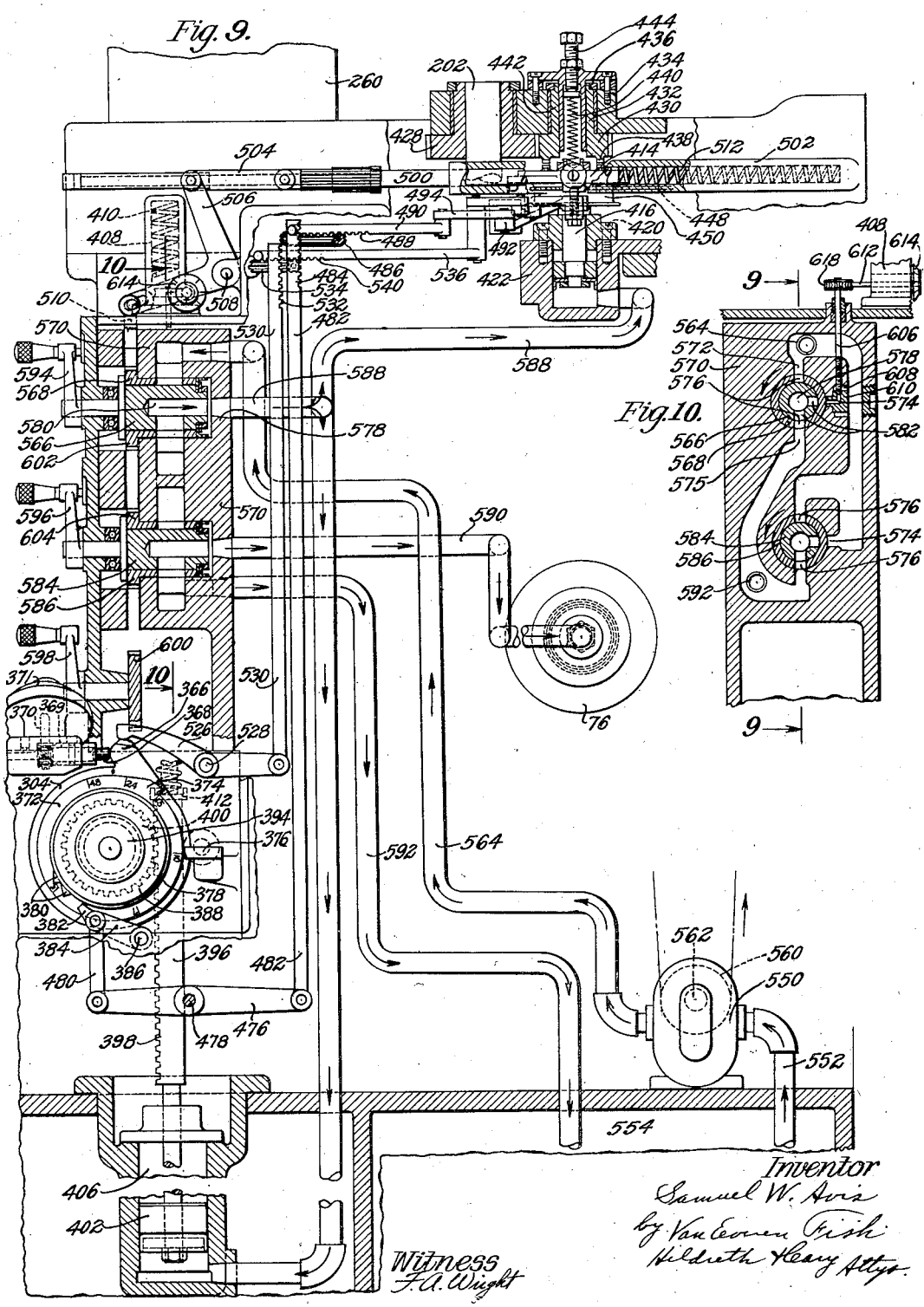

Dec. 24, 1935. S. W. AVIS 2,025,034
GEAR CUTTING MACHINE
Filed June 23, 1931  10 Sheets-Sheet 8

Witness
F. A. Wright

Inventor,
Samuel W. Avis
by Van Everen Fish
Hildreth Neary Atty.

Dec. 24, 1935.   S. W. AVIS   2,025,034
GEAR CUTTING MACHINE
Filed June 23, 1931   10 Sheets-Sheet 9
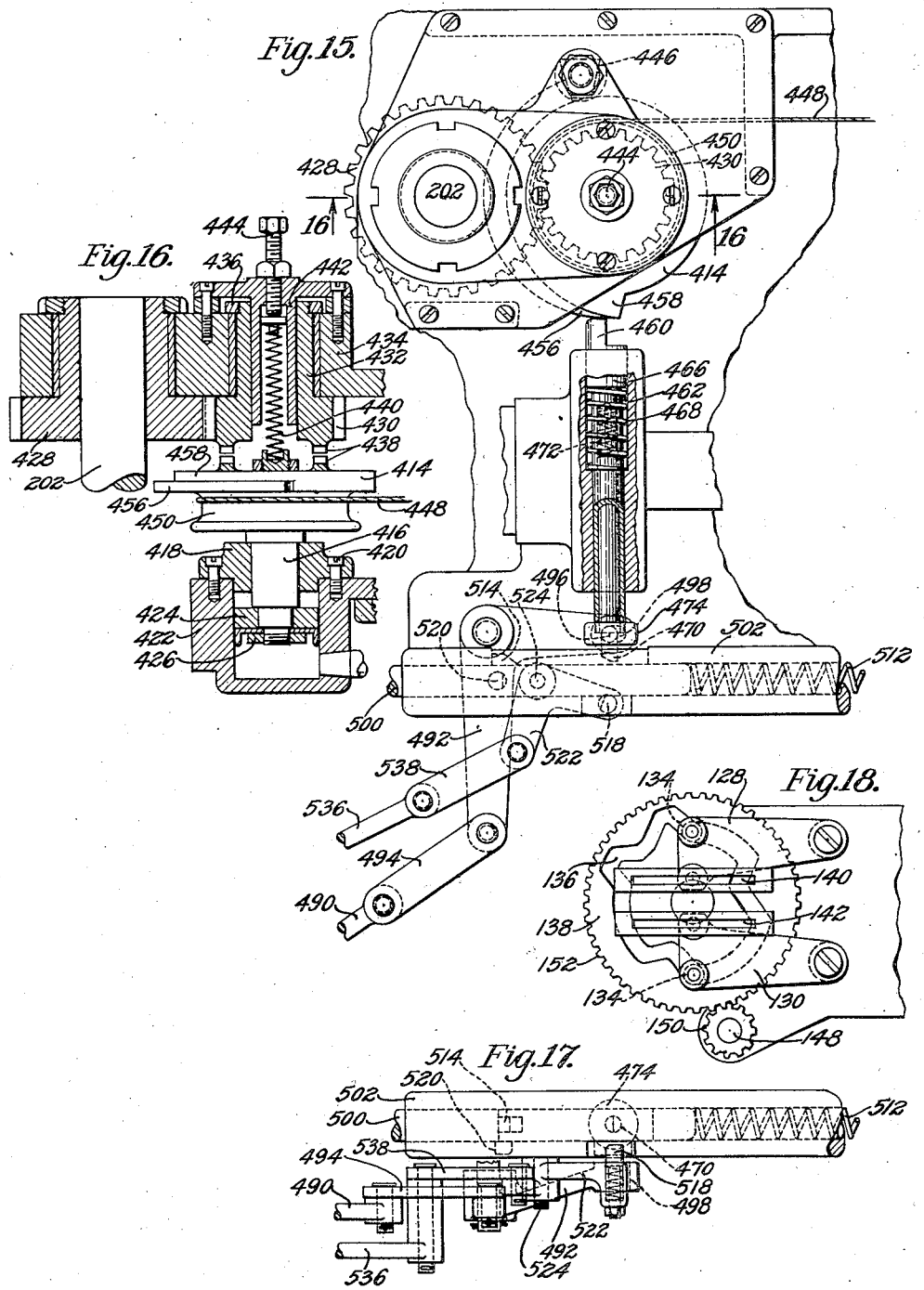

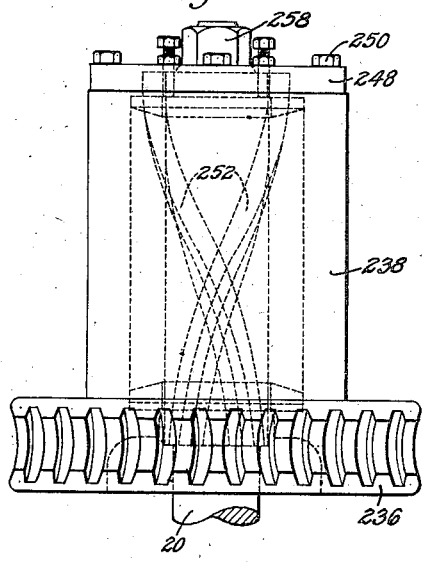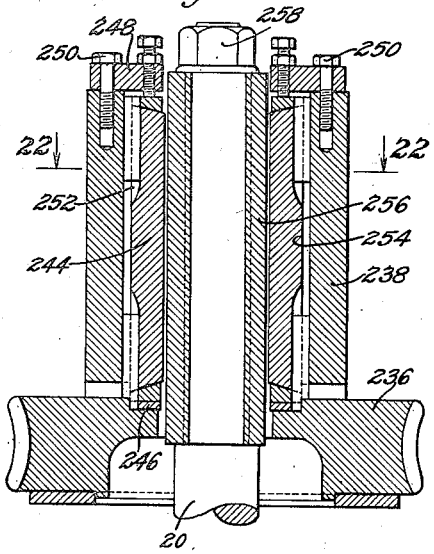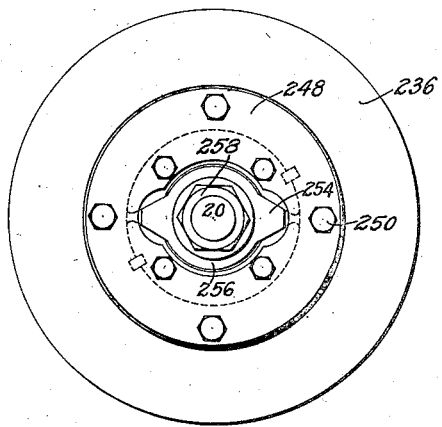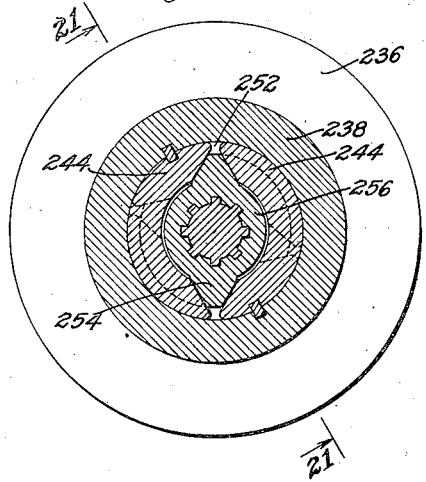

UNITED STATES PATENT OFFICE 2,025,034

GEAR CUTTING MACHINE

Samuel W. Avis, Providence, R. I., assignor to Brown & Sharpe Manufacturing Company, a corporation of Rhode Island Application June 23, 1931, Serial No. 546,231

54 Claims. (Cl. 90—9)

The present invention relates to gear cutting machines, and is herein disclosed as embodied in a machine of the general type employing a gear shaped planing cutter and a work spindle which are given relative reciprocatory movements to impart a translatory cutting movement to the cutter across the face of a circular gear blank supported on the spindle, and relative rotational movements to maintain a substantially equal peripheral speed between the cutter and the gear blank at the point of cutting contact, and are relatively movable laterally of the reciprocatory cutting movement to impart the required relative feeding and relieving movements to the cutter and the gear blank.

The principal object of the present invention is to provide a novel and improved machine of this general description which will be simple and sturdy in construction, efficient in operation, and more readily adjusted and controlled by the operator than machines of this general description previously developed.

Another object of the invention, more specifically, is to provide a simple and improved mechanism for imparting relative feeding and relieving movements to the cutter and gear blank which is capable of rapid and accurate adjustment to determine within precise limits the required depth of cut, and is at the same time ruggedly constructed to maintain a high degree of efficiency and accuracy of operation against the pressure of the repeated cutting stroke during the continued life of the machine.

A further object of the invention is to provide novel and improved means for controlling the operation of the machine and for actuating its various parts, whereby greater flexibility and certainty in the operation of the various parts of the machine is secured and particularly of the feeding mechanism for bringing the cutter and the blank relatively into depth.

With these and other objects in view, as will hereinafter appear, a feature of the present invention contemplates the provision in a machine of the general type described, including a cutter spindle and a work spindle, of a support for one of these spindles fixed against lateral movement of the other spindle mounted for and a support for the other spindle mounted for movement about a fixed pivot, together with means for imparting movements to the pivoted support to feed the cutter and gear blank relatively into the required depth and also to relieve the cutter during each retracting stroke.

Another feature of the invention contemplates the provision in a machine of the general type described including a cutter spindle, a work spindle, a support for one of these spindles mounted for movement about a fixed pivot, and means for imparting cutter relieving movements to said support, of driving connections including a member mounted co-axially with the pivot of the movable support and a compensating idler for rotating the spindle mounted thereon to maintain the desired peripheral relationship of the cutter and the work blank relatively to each other during the relieving movements of the movable support about its pivot.

Another feature of the invention contemplates mounting the gear-shaped cutter, of a machine of the general type described, for reciprocatory cutting movement in a fixed support, and providing a work support which is movable laterally towards and from the cutter and to which work feeding and relieving movements are imparted to feed the work to depth and to relieve the cutter during each backward cutter stroke.

Other features of the invention contemplate the provision in a machine of the general type above referred to of a fluid pressure system for controlling the operation of the machine and for actuating various of its parts, as hereinafter described and claimed.

Figure 2:
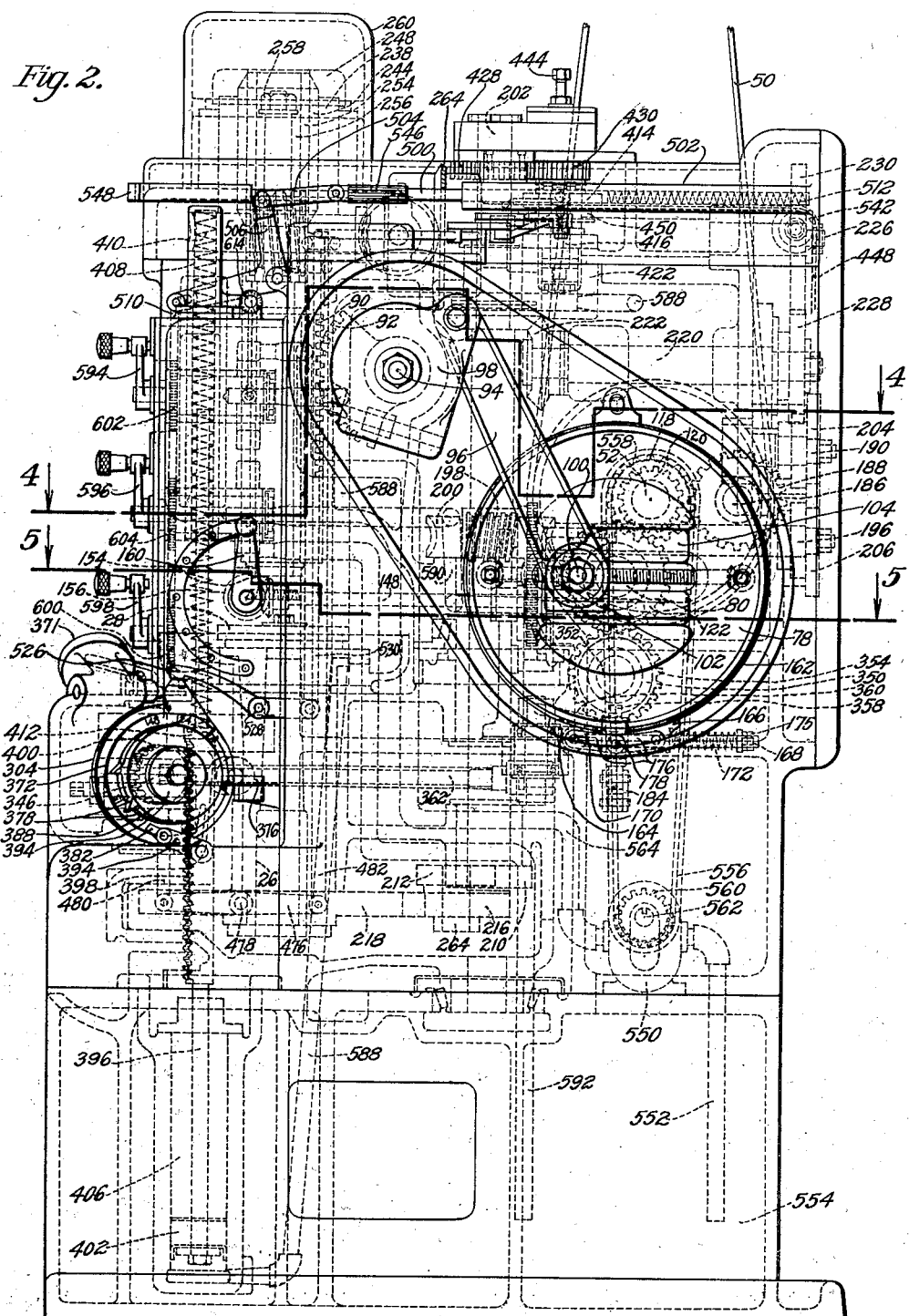
Figure 3:
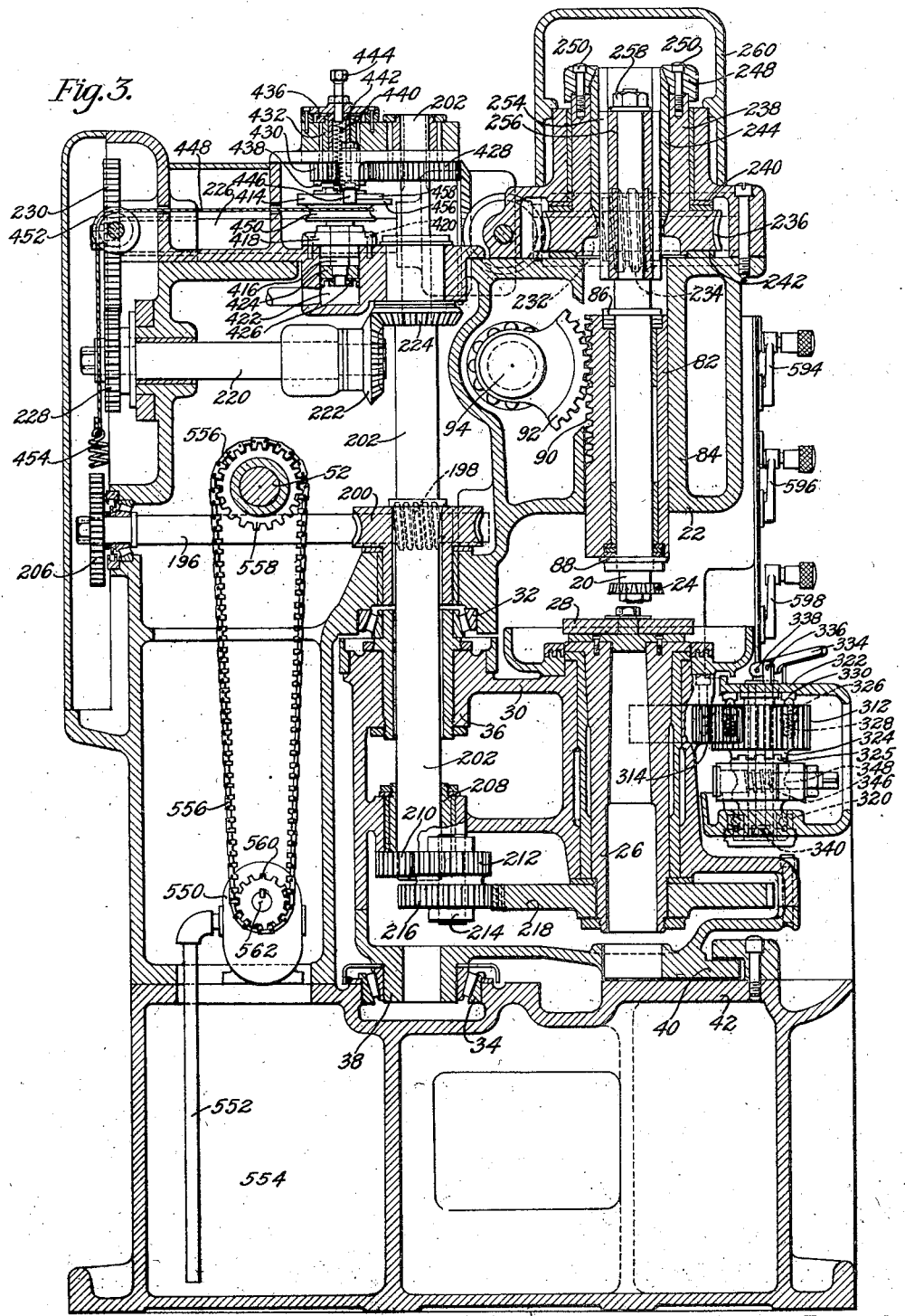
Figure 4:
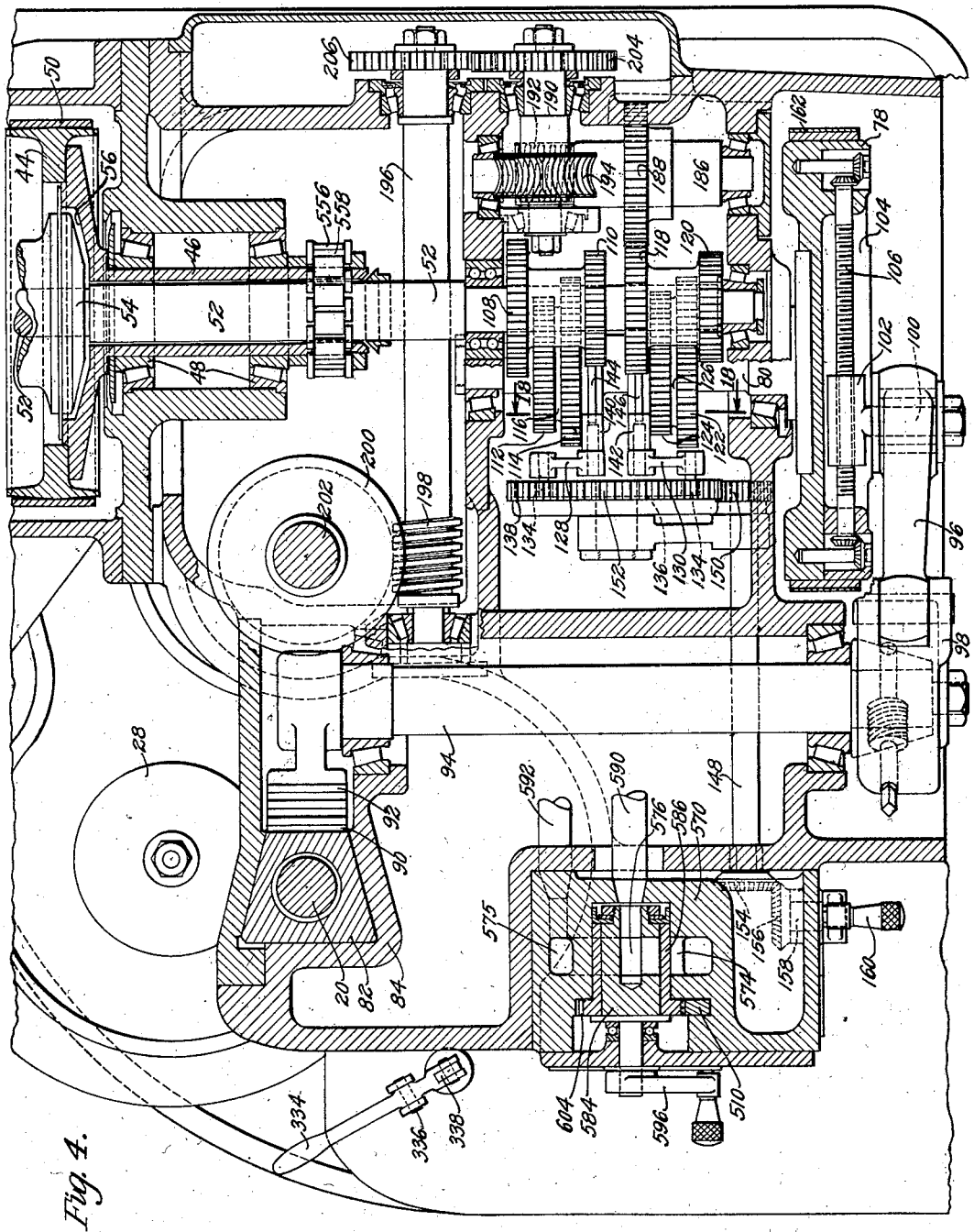
Figure 7:
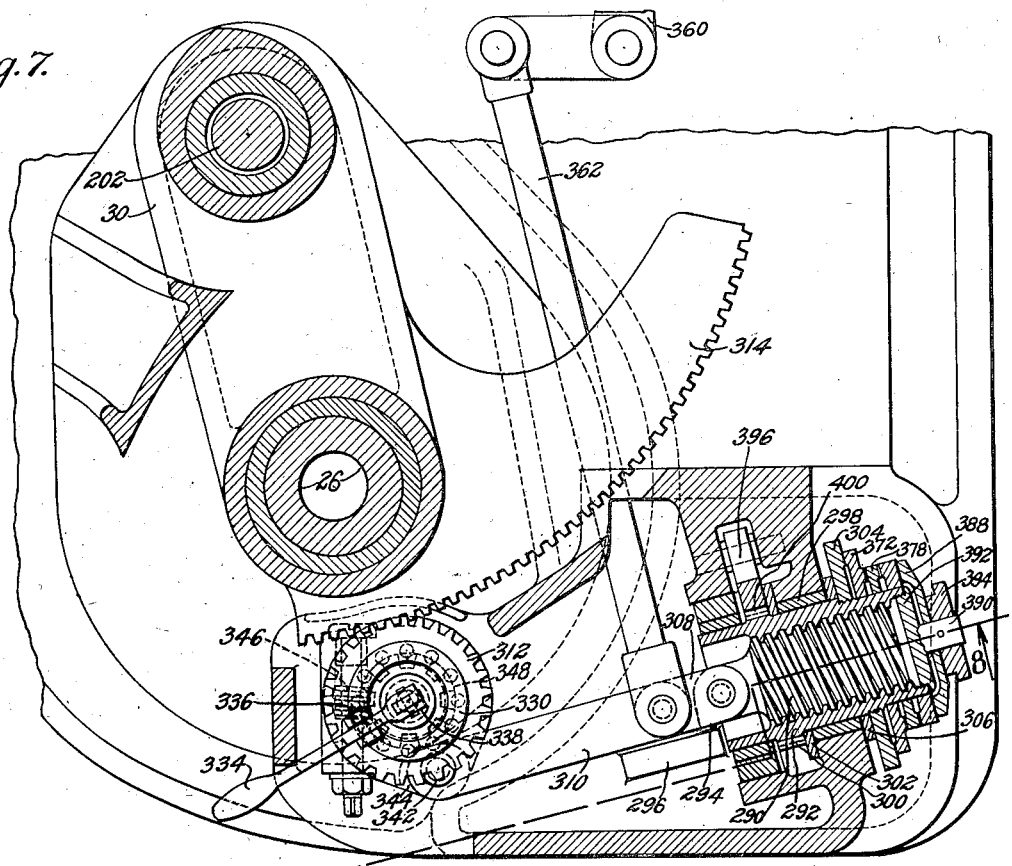
Figure 8:
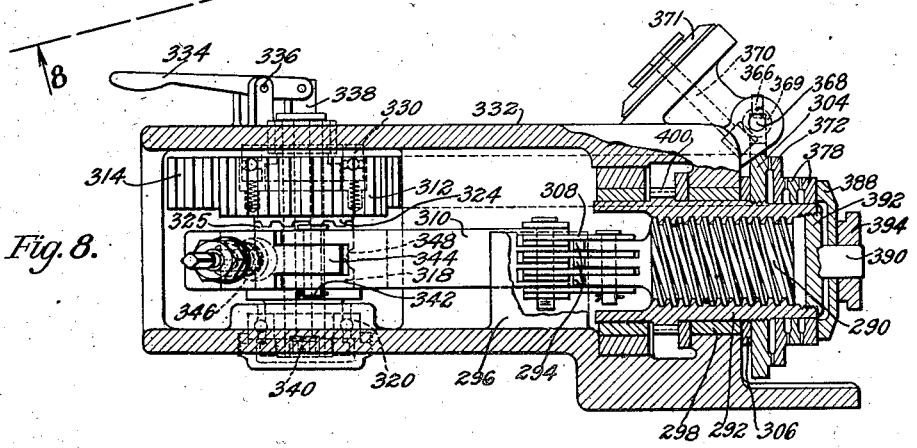
Figure 11:
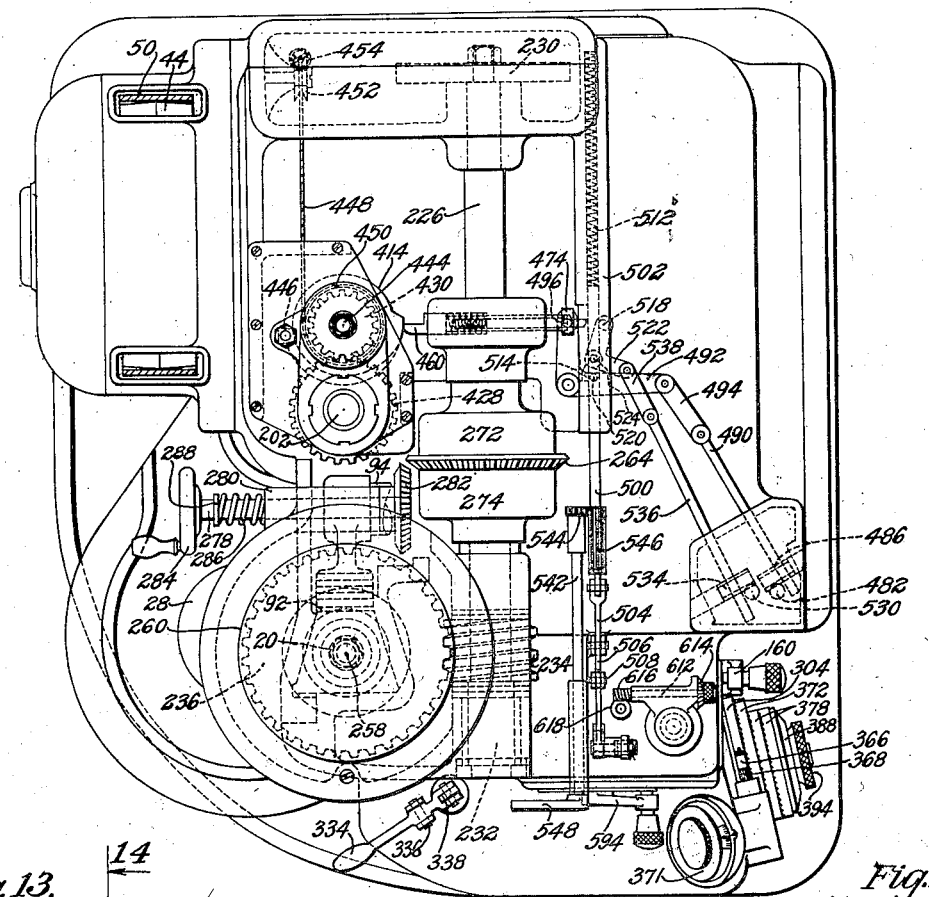
Figure 13:
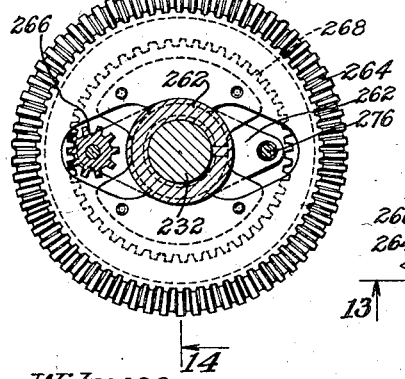
Figures 12, 14:
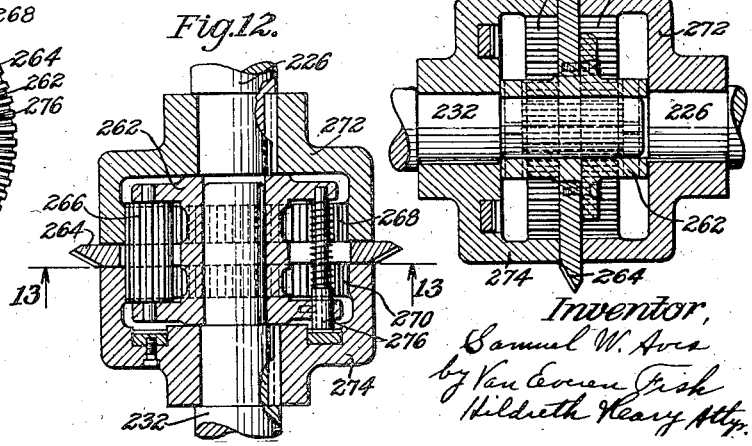

The several features of the present invention consist also in the devices, combinations and arrangement of parts hereinafter described and claimed which, together with the advantages to be obtained thereby, will be readily understood by one skilled in the art from the following description taken in connection with the accompanying drawings:

In the drawings, Fig. 1 is a view in front elevation of a gear cutting machine embodying in a preferred form the features of the invention; Fig. 2 is a view in right elevation of the machine; Fig. 3 is a sectional view of the machine in left side elevation taken approximately on the line 3—3 of Fig. 1; Fig. 4 is a sectional plan view taken approximately on the line 4—4 of Fig. 2; Fig. 5 is a sectional plan view taken approximately on the line 5—5 of Fig. 2; Fig. 6 is a detail sectional view taken on the line 6—6 of Fig. 5; Fig. 7 is a detail sectional plan view taken approximately on the line 7—7 of Fig. 1, illustrating particularly the work feed and relieving mechanism; Fig. 8 is a view taken on the line 8—8 of Fig. 7, illustrating particularly certain portions of the feed mechanism; Fig. 9 is a somewhat diagrammatic view of the machine in side elevation partly in section on the line 9—9 of Fig. 10, illustrating particularly the fluid pressure control system for the feed and for starting and stopping the machine; Fig. 10 is a detail sectional view taken on the line 10—10 of Fig. 9, illustrating particularly the control valves for the liquid pressure control system; Fig. 11 is a plan view of the machine; Fig. 12 is a detail plan view of the mechanism for adjusting the position of the peripheral edge of the cutter with relation to the gear blank, partly in section and with a portion of the casing broken away to disclose the underlying parts; Fig. 13 is a view taken on the line 13—13 of Fig. 12; Fig. 14 is a sectional view taken on the line 14—14 of Fig. 13; Fig. 15 is a detail plan view on an enlarged scale of the timing mechanism shown in Fig. 11; Fig. 16 is a detail sectional view taken on the line 16—16 of Fig. 15; Fig. 17 is a detail view in elevation of certain of the parts shown in Fig. 15; Fig. 18 is a detail view in elevation of the control cam for the change speed mechanism shown in Fig. 4, for varying the speed of reciprocation of the cutter; Fig. 19 is a detail view of the mechanism for controlling the angular position of the cutter during its reciprocatory movements, parts being arranged for the production of helical gears; Fig. 20 is a plan view of the parts shown in Fig. 19; Fig. 21 is a sectional view of the same mechanism taken on the line 21—21 of Fig. 22; and Fig. 22 is a sectional plan view taken on the line 22—22 of Fig. 21.

The gear cutting machine herein disclosed as embodying, in a preferred form, the several features of the present invention, comprises a gear shaped planing cutter mounted on a cutter spindle for lengthwise reciprocatory movements transversely of a gear blank which is supported with relation thereto in the machine on a corresponding work spindle. Continuous rotational movements are imparted to the cutter spindle and the work spindle during the operation of the machine in timed relation to maintain a substantially equal peripheral speed at the point of contact of the cutter and the gear blank being operated upon as the cutting operation progresses around the gear blank. In order to permit a relative movement of the cutter and gear blank laterally with relation to each other for both the feeding and relieving operations, the work spindle is carried on a support which is mounted to swing about a fixed pivot to move the work spindle toward and away from the cutter spindle which is mounted against lateral movement in a fixed portion of the machine frame.

The mechanism for moving the work support about its pivot to feed the work into depth with relation to the cutter, comprises a feed member which is advanced gradually by means of a sleeve screw threaded thereto which is fixed against endwise movement on the machine frame, and is provided with end thrust bearings to take up or absorb the side thrust caused by the cutting stroke of the cutter across the face of the gear blank. In order to provide a simple and effective arrangement of this mechanism to back off or relieve the cutter relatively to the gear blank during the retracting movement of the cutter, a toggle connection is provided between the feed member above described and the work support which is broken and straightened to move the gear blank into and out of operative position in timed relation to the reciprocations of the gear cutter. This arrangement in addition to providing a single set of operating connections for controlling the movements of the work support during the relieving and feeding operations, has the advantage that the lateral thrust of the cutting stroke is taken up against the thrust bearings for the sleeve which controls the position of the feed member, and therefore avoids undue stress or wear on the connections for imparting the relieveing movements to the work support.

In order to secure a compact and simple arrangement of the mechanism for imparting the rotational movements to the work spindle and gear blank carried thereon in timed relation to the cutter, a drive shaft is provided which is mounted co-axially with the work support and extends downwardly through the pivot of the work support, and is connected to impart the required rotational movements to both the cutter spindle and the work spindle. The driving connections for imparting rotational movements to the work spindle from the driving shaft comprise a compensating idler which is arranged to maintain the required peripheral relationship between the gear blank and the cutter as the work support is moved about its pivot during the feeding and relieving movements imparted thereto. This idler may be designed to slightly retard or advance the rotational movement of the gear blank during the relieving movement of the work support, and thus to provide as great a clearance for the cutter during its retracting movement as may be desired.

The driving connections for imparting rotational movements to the cutter spindle and the work spindle, and for imparting reciprocatory cutting movements to the cutter spindle, are controlled by means of a machine clutch which is operated by the liquid pressure control system hereinafter described. In order to bring the machine to a quick stop, a braking mechanism is provided which acts automatically upon disconnecting the machine clutch to arrest the further reciprocatory cutting movement of the cutter spindle.

In order to bring the work into the exact depth required, a setting mechanism is provided which comprises a series of disks mounted on the screw-threaded sleeve above referred to, and provided with abutments to engage corresponding stops on the machine frame to control the rotational movements of the sleeve to advance the feed member above described. One disk is rigidly secured to the sleeve and is formed with an abutment to engage with a corresponding stop on the machine frame to positively limit the rotational feeding movement of the sleeve to advance the feed member. A second disk is adjustably mounted on the sleeve and is provided with an abutment to engage with a fixed stop to limit the movement of the sleeve in an opposite direction for measuring accurately the distance through which the sleeve is to be rotated to determine the final depth of the gear teeth. Two additional disks adjustably mounted on the sleeve to engage with a corresponding stop lever are arranged to permit the feeding operation to be interrupted at one or more points while the cutting operation is continued for a complete revolution about the gear blank to form preliminary cuts of an intermediate depth. An adjustable connection is provided between the feed member and the work support which enables the operator in setting up the machine after the sleeve and the feed member controlled thereby have been retracted a distance corresponding to the required pitch to be given the gear teeth to bring the gear blank into grazing contact with the cutter, so that the advancing movement of the feed member will be effective to bring the gear blank and cutter relatively to the depth required.

Inasmuch as the gear blank, in being fed to either an intermediate or final depth, is gradually moved toward the cutter during the continued rotational movements of the cutter and work spindle, the cutting operation must be continued completely around the gear blank from the point at which the feeding movement is arrested to complete each of the preliminary and final cuts. Accordingly, to render the machine completely automatic in operation, a timing mechanism is provided which is thrown into operation when the feeding movement is arrested, and acts after a complete revolution of the gear blank from this point for each of the preliminary cuts to cause the feeding movement to be resumed, and after the work has been brought finally into depth to stop the machine.

For operating the feeding and timing mechanisms above described and for actuating the starting and stopping mechanism, the machine herein disclosed is provided with a liquid pressure control system which is arranged to make the machine entirely automatic in operation. A pump continuously driven from an outside source of power, supplies liquid under pressure to the system which includes three cylindrical pressure chambers fitted with pistons arranged to operate respectively the feeding mechanism, the starting and stopping clutch, and the timing mechanism above described. Control valves which may be operated manually by means of manual control levers or automatically by the timing mechanism are provided to control the operation of the starting and stopping clutch and the feeding mechanism. The rate at which the work is fed toward the cutter is determined within narrow limits by means of a needle valve in the pipe connections leading from the pump to the feed expansion pressure chamber.

After the machine has been thrown into operation, the feeding operation continues until the further rotation of the sleeve for advancing the feed member is positively arrested by the engagement of any one of the stops on the machine frame by the corresponding disk on the sleeve. The increase in pressure which is built up, due to the fact that the volume of the liquid acting on the surface against which the liquid pressure is being exerted is no longer expanding, then causes the timing mechanism to be thrown into operation, so that after a complete revolution of the gear blank from the point at which a feed was arrested, the operating conditions of the machine will be automatically altered to permit a continuation of the feeding operation, or if the work has been fed into depth to then stop the machine.

Referring to the drawings, the gear cutting-machine herein disclosed as embodying in a preferred form the several features of the present invention comprises a rotatable cutter spindle 20 vertically mounted in the machine frame 22 and provided at its lower end with a gear-shaped planing cutter 24 (see Figs. 1 and 3). A rotatable work spindle 26 for supporting a circular gear blank 28 is mounted to cooperate with the cutter in a support 30 which is arranged to swing laterally about a fixed pivot which comprises the bearings 32 and 34 arranged to receive corresponding axle posts or trunnions 36 and 38 formed on the support 30. In order to form a firm foundation for the support 30 against the downward thrust of the cutter 24 during the operation of the machine, the support 30 has formed on its under side a bearing surface 40 which engages at all times with the corresponding arcuate way 42 formed in the base of the machine. The work support 30 is moved about its pivot to impart feeding movements to the work into engagement with the cutter, and is also actuated in timed relation to the reciprocating stroke of the cutter to impart relieving movements to the work.

The driving mechanism from which power is supplied for imparting relative rotational movements to the cutter and work spindle to maintain a substantially equal peripheral speed at the point of cutting contact, for imparting the vertical reciprocatory cutting movements to the cutter and the cutter spindle, and for moving the support 30 about its pivot to impart the required feeding and relieving movements to the work blank, comprises a pulley 44 (see Figs. 1 and 4) which is formed on one end of a sleeve 46 journaled in bearings 48 in the machine and continuously driven from an outside source of power by means of a belt 50. Journaled within the sleeve and arranged to turn independently thereof is a driving shaft 52 which carries a clutch member 54 keyed to turn with the shaft and slidable lengthwise thereof to bring the clutch member into engagement with the corresponding clutch surface 56 formed within the base of the pulley 44.

The connections for moving the clutch member 54 into and out of operative engagement with the pulley 44 for starting and stopping the machine, comprise a clutch actuating lever 58 which is pivoted at 60 to the machine frame and at its upper end carries a yoke 62 provided with cam rolls 64 which engage a groove formed on the movable clutch member 54. A tension spring 68 stretched between the lower end of the clutch lever 58 and a point on the machine frame tends to maintain the clutch normally in its open or disconnected position. The clutch lever 58 is moved about its pivot 60 against the pressure of the spring 68 to throw the machine into operation by means of an axially movable shaft 70 which is connected at one end through a link 72 to the lower portion of the clutch lever 58, and at its other end is provided with a piston 74 arranged to slide in a liquid pressure chamber 76, to which liquid under pressure is supplied from the hydraulic control system for the machine hereinafter to be described.

Vertical reciprocatory movements are imparted to the cutter spindle 20 and cutter 24 from the driving shaft 52 through connections which comprise a flywheel 78 (see Figs. 2, 3 and 4) secured on a shaft 80 mounted in a parallel relationship to and beneath the driving shaft 52. The connections from the flywheel 78 for actuating the spindle comprise a block 82 mounted for vertical movement in ways 84 in the machine and journaled to receive the cutter spindle 20 which is permitted to turn freely with relation to the block, but is prevented from endwise movement relatively thereto by means of the bearing members 86 and 88 secured to the cutter spindle 20 respectively at each end of the block 82. A rack 90 formed in the block 82 engages with a corresponding gear segment 92 which is rigidly secured to one end of a rock shaft 94 extending horizontally across the machine. The rock shaft is given a reciprocatory movement to advance and retract the cutter from the flywheel 78 through connections which include a link 96 secured at its upper end to a short lever arm 98 on the rock shaft 94 and at its lower end pivotally secured to a crank pin 100 on the flywheel 78. In order to permit a ready adjustment of the amplitude of the cutter stroke, the crank pin 100 is carried on a slide 102 which may be moved toward or away from the center of the flywheel along ways 104 by means of a screw threaded member 106.

In order to permit an adjustment of the speed of reciprocation of the cutter in accordance with the requirements of the work, a set of change speed gears is provided for driving the flywheel shaft 80 at different rates of speed from the constant speed driving shaft 52. These gears, as best shown in Fig. 4 of the drawings, comprise the gears 108 and 110 fixed to the driving shaft 52 and the sliding gears 112 and 114 formed on a sleeve 116 which is keyed to turn with the flywheel shaft 80 and may be moved in one direction from a central inoperative position to cause the gear 112 to mesh with gear 108 or in the other direction to cause the gear 114 to mesh with the gear 110. In order to secure further changes in the speed of reciprocation of the cutter, a second pair of gears 118 and 120 are formed on the driving shaft 52 to engage with a corresponding set of gears 122 and 124 formed on a sleeve 126 which is mounted to slide on the flywheel shaft 80 and is keyed to turn therewith.

The sleeve gears on the flywheel shaft 80 are controlled to produce any one of four different speeds of reciprocation of the cutter, by means of two triangular shaped shifting levers 128 and 130 (see Figs. 4 and 18) pivoted at their lower ends on the machine, and provided each with a cam roll 134 which engage in opposite portions of a cam groove 136 formed in one face of a cam disk 138. The shifting levers 128 and 130 are also provided with yokes 140 and 142 which engage with corresponding flanges 144 and 146 formed on the sleeves 116 and 126 carrying the sliding gears. The position of the cam disk 138 may be controlled by the operator to bring any one of the shifting gears into engagement with its corresponding driving gear through connections which comprise a shaft 148 rotatably mounted in the machine carrying at its rear end a pinion 150 meshing with a corresponding external gear 152 formed on the periphery of the cam disk 138. At its forward end the shaft 148 is connected by means of the bevel gears 154 and 156 to a stub shaft 158 mounted at right angles thereto in the machine frame and provided with a manually operable lever 160 to enable the operator to make the successive adjustments of the change speed mechanism.

In order to bring the machine to a quick stop after the clutch member 54 has been thrown out to stop the machine, a braking mechanism is provided which acts automatically upon disconnecting the driving clutch to arrest the continued rotation of the flywheel 78 within as short a compass as possible. This mechanism as shown in Figs. 1 and 2 comprises a brake band 162 which extends around the periphery of the flywheel 78 and is provided at one of its adjoining ends with a lug 164, its other adjoining end being secured to a bracket 166 fixed in the machine frame. In order to exert a braking tension on the band, a rod 168 is mounted to slide in the bracket 166, and is pivotally connected at 170 to the lug 164. A compression spring 172 coiled about the rod 168 between the bracket 166 and an adjustable nut 175 on the rod 168, tends to draw the two ends of the band together to apply the required braking force. The mechanism for controlling the operation of the brake described, comprises a pair of toggle levers 176 which are connected at their free ends respectively to the lug 164 and the fixed bracket 166, so that the movement of the central pivot 178 to straighten the toggle will cause a separation of the ends of the brake band 162 against the pressure of the spring 172 to release the brake, while a movement of the central pivot 178 to break the toggle will, by allowing the two ends of the band to be brought together under the pressure of the spring 172, act to set the brake.

The toggle levers 176 are actuated through connections from the clutch actuating lever 58, so that the movement of the clutch lever 58 to connect the machine clutch and start the machine at the same time acts to straighten the toggle and release the braking mechanism, while a reverse movement of the clutch lever 58 to disengage the machine clutch and stop the machine, acts simultaneously to break the toggle connections and permit the application of the brake band under the pressure of the spring 172 to stop the further rotation of the flywheel 78. These connections comprise a bell-crank lever 180, one arm of which is connected by a horizontally arranged link 182 to the lower portion of the clutch actuating lever 58, the other arm of the bellcrank being similarly connected by a link 184 to the central pivot 178 of the toggle levers 176.

The mechanism for imparting rotational movements to the work spindle and to the cutter spindle from the main driving shaft 52 comprises a stub shaft 186 which carries a gear 188 permanently meshing with the gear 118 on the driving shaft. The stub shaft 186 drives a stub shaft 190 set at right angles thereto through the engagement of a worm 192 on the shaft 186 with a worm gear 194 on the shaft 190. The stub shaft 190 in turn drives a shaft 196 which is mounted parallel thereto and at its forward end carries a worm 198 which engages with a worm gear 200 on a vertical drive shaft 202. To enable the speed of rotation of the cutter and gear blank to be readily adjusted in accordance with the requirements of the work, the two shafts 190 and 196 extend through the casing at the rear of the machine, and are provided with keys to receive a set of change speed gears 204 and 206 which can be replaced by the operator to drive the shaft 196 at different rates of speed.

The drive for both the cutter spindle and the work spindle is taken from the vertical drive shaft 202. In order to provide the most efficient and compact arrangement of the gearing for driving the work spindle on its rotatable support 30, the vertical drive shaft 202 is arranged to extend downwardly through the pivot of the support on the machine frame, being journaled near its upper end in the machine frame, and being supported at its lower end within the support in a bearing 208. At its lower end the drive shaft 202 carries a gear 210 which engages with the upper member 212 of a compensating idler gear mounted at 214 on the work support 30, the lower member 216 of the idler gear being arranged to mesh with a gear 218 secured to the lower end of the work spindle 26. The compensating idler gear comprising the members 212 and 216 through which the work spindle is driven from the vertical driving shaft 202, is provided to maintain the desired peripheral relationship between the cutter and the blank as the work support is moved about its pivot to feed the work into depth and to back off the cutter with relation to the work blank during each retracting movement of the cutter. If this idler gear were omitted and the gear 218 was arranged to mesh directly with the gear 210, it will be obvious that movements of the work support about its pivot would produce a rotation of the gear 218, this additional rotation of the gear 218 causing an acceleration of the rotational movement of the gear as the work support is moved away from the cutter and a retarding effect on the rotational movement of the gear as the work support is moved towards the cutter. The idler gear provides a means whereby this objectionable accelerating and retarding movement of the gear 218 may be eliminated and whereby the work blank can if desired be given a direct lateral movement away from the cutter without any change in the peripheral relationship of the cutter and blank. However, in order to secure a greater amount of clearance between the sides of the teeth of the cutter and the corresponding side portions of the teeth cut in the gear blank than would normally be secured by a direct lateral movement of the blank away from the cutter, the members 212 and 216 of the compensating idler gear are proportioned so that the movement of the work support about its pivot will have a slightly modifying effect on the rotational movement of the gear blank as the work support is backed off from the cutter, and a slightly accelerating effect as the work support is again moved into operating position to bring the cutter and blank into their proper peripheral relationship for each succeeding cutting stroke.

Rotary movements are imparted to the cutter from the vertical driving shaft 202 through connections comprising a short horizontally arranged shaft 220 which extends rearwardly through the casing of the machine, and is provided at its forward end with a bevel gear 222 engaging with a corresponding bevel gear 224 secured to the vertical driving shaft 202. The shaft 220 in turn drives a second shaft 226 mounted somewhat above and parallel thereto, being connected thereto through change speed gears 228 and 230 as shown in Fig. 3 of the drawings. The shaft 226 is arranged to drive a second shaft 232 which is mounted to turn on the same axis and forms a continuation of the shaft 226, being connected to turn therewith by means of an adjusting mechanism hereinafter to be described. A worm 234 is formed on the shaft 232 to engage with a worm gear 236 which is sleeved on the spindle and is keyed to impart the required rotational movements thereto.

The driving connections for imparting rotational movements to the reciprocating spindle from the worm gear 236 may be arranged alternatively to provide a vertical movement of the cutter blades at right angles to the face of the blank to cut ordinary gears, or a helical movement of the spindle to cause the cutting blades to move across the face of the blank at a different angle for the cutting of helical gears, as desired. For this purpose, the worm gear 236 is formed on the lower end of a sleeve 238 which fits over the cutter spindle 20 and is held against endwise movement in the machine frame by means of the end thrust bearings 240 and 242 engaging with opposite faces of the worm gear 236 (see Figs. 3, and 19 to 22). Within the sleeve 238 are fitted two semi-circular complementary guide blocks 244, each of which is keyed to turn with the outer sleeve 238 and is held against endwise movement relatively thereto between an abutment 246 at the lower end of the sleeve and a removable ring 248 secured by screws 250 to the upper end of the sleeve 238. The adjoining edges of the removable blocks 244 are bevelled to form grooves 252 which are engaged by corresponding flanges 254 formed on a corresponding guide block in the form of a sleeve 256 which is splined onto the reduced upper end of the spindle and is held rigidly in place thereon by means of a lock nut 258. A removable cap 260 forming a portion of the casing of the machine normally covers the upper end of the cutter spindle and provides easy access by the operator, so that the removable members 244 and the cooperating sleeve 256 may be readily changed to adapt the machine for cutting straight or spiral gears.

As illustrated in Fig. 3 of the drawings, the guide members 244 and the sleeve 256 are designed to provide a vertical reciprocation of the gear cutter to cut teeth at right angles to the plane of the gear blank. Figs. 19 to 22 illustrate a modification of this design in which helical guides and a sleeve with flanges correspondingly shaped are employed to cut helical gears. Since the two constructions are essentially identical in design, the same reference characters have been employed to designate the parts.

In order to permit an adjustment of the angular position of the cutter spindle 20 with relation to the work spindle 26 to adjust the position of the gear cutter with the peripheral portion of the gear cutter with relation to the corresponding peripheral position of the gear blank, an adjustable driving connection is provided between the shafts 226 and 232 which is adapted normally to provide a direct drive from one shaft to the other, but may be actuated by the operator to move one shaft relatively to the other and thus to adjust the angular position of the cutter with relation to the gear blank. This adjustable driving connection, as best shown in Figs. 11 to 14 inclusive, comprises a sleeve 262 which is mounted to rotate freely on a reduced portion of the end of the shaft 232, and has formed thereon a large bevel gear 264. There is also mounted on the sleeve 262 an elongated gear 266 which extends through an apertature formed in the gear 264 and is adapted to engage with each of two internal gears 268 and 270 formed respectively on the inner surfaces of the enlarged casings 272 and 274 secured respectively to shafts 226 and 232. A different number of gear teeth are provided on the internal gears 268 and 270 so that a rotation of the spur gear 264 relatively to the shaft 226 causes the small gear 266 meshing with the internal gears 268 and 270 to move around the inside of the casing, thus causing the angular position of the shaft 232 to be altered with relation to the position of the shaft 226. In order to prevent any possibility of slippage due to a rotation of the spur gear 264 relatively to the shaft 226 during the operation of the machine, a spring-pressed plunger 276 is also mounted on the sleeve 262 and frictionally engages the casing 274 on the shaft 232. Manually operated connections are provided for rotating the spur gear 264 and sleeve 262 to adjust the angular position of the cutter comprising a shaft 278 which is journaled in a bearing 280 in the machine, and is provided at its rear end with a bevel gear 282 adapted to engage with the bevel gear 264 and at its forward end with a manually operable control wheel 284.

A compression spring 286 coiled about the shaft 278 between a washer 288 on the shaft and the end of the bearing 280 tends to move the shaft and gear 282 axially out of engagement with the gear 264. This movement of the shaft is limited by the engagement of the hub of the gear 282 with the rear end of the bearing 280. When the machine is at rest, the operator, to perform the desired adjustment, merely pushes the crank in to engage the bevel gears and then rotates the shaft 278 until the desired angular position of the cutter is secured.

The mechanism through which the movable support 30 is oscillated about its pivot to impart the required feeding and relieving movements to the gear blank, as shown in Figs. 2, 3 and 5 to 8, comprises a feed member 290 which is moved axially by means of a rotatable nut or sleeve 292 screw threaded on the feed member and externally supported on the machine frame. In order to prevent the feed member 290 from turning with the sleeve 292, flat faces 294 are formed on the forward ends of the feed member to engage with a corresponding abutment 296 on the machine. The sleeve 292 is mounted to rotate in a bearing 298 and is fixed against endwise movement in one direction by the engagement of one face of a flange 300 on the sleeve with a corresponding end thrust bearing 302, and is fixed against endwise movement in the other direction by the engagement of a disk 304 with an end thrust bearing 306. The feed member 290 is connected by means of the toggle links 308 and 310 to a gear 312 which is mounted to turn about a fixed axis on the machine frame and engages with a gear segment 314 on the support 30 so that the advancing movement of the feed member, by causing a corresponding rotation of the gear 312, acts to move the support 30 about its pivot and bring the gear blank into operative relationship to the cutter.

In order to permit the work support to be swung into and out of operative position, and to enable the operator in setting up the machine to bring the gear blank into grazing contact with the cutter, connections are provided between the toggle links 308 and 310 and the gear 312 including a clutch which may be disconnected to allow the gear 312 and work support 30 to move freely about their pivots, and a worm and gear connection for producing a fine adjustment of the work support and gear blank with relation to the toggle levers and the feed member. These connections comprise a hollow shaft 316 (see Fig. 6) which is supported at its lower end within a sleeve 318 which is journaled in a bearing 320 in the machine frame, and at its upper end is journaled in a bearing 322 in the frame. The gear 312 is rigidly mounted on the hollow shaft 316 above the sleeve 318, and is provided on its under side with clutch teeth 324 which are arranged to engage with corresponding clutch teeth 325 formed on the upper end of the sleeve 318. The gear 312 and shaft 316 are normally held in a depressed position with the clutch teeth in engagement by means of a series of compression springs 328 which are seated in corresponding recesses formed in the upper face of the gear 312 and engage with a ring 326 which is arranged to bear against a corresponding ring 330 secured to the casing 332 within which this mechanism is mounted. To provide a minimum of friction, a ball bearing is provided between the two rings.

Mechanism is provided under the control of the operator for raising the gear 312 to disconnect the clutch and permit the free movement of the support 30 about its pivot which comprises a hand operated lever 334 pivoted at 336 on the casing 332 and at one end connected to a rod 338 fitted within the hollow shaft 316. At its bottom end, the rod 338 is provided with a washer 340 which overlies the bottom end of the hollow shaft 316 so that the movement of the lever 334 about its pivot to raise the rod 338 causes the hollow shaft 316 and the gear 312 connected thereto to be lifted against the pressure of the springs 328 to disengage the clutch.

In order to provide a fine adjustment of the support 30 and the gear blank with relation to the toggle levers 308 and 310 and the feed member 290 to enable the operator to bring the gear blank into grazing contact with the cutter in setting up the machine, the toggle member 310 is pivotally connected by a pivot pin 342 to a collar 344 which is mounted on the sleeve 318 and is adjustably secured to turn therewith by the engagement of a worm 346 mounted on the collar with a worm gear 348 formed in the periphery of the sleeve 318. With this arrangement of the parts, it will be seen that the operator is enabled, by rotating the worm 346, to secure a fine angular adjustment of the sleeve 318 and gear 312 with relation to the collar 344 to move the gear blank slightly toward or away from the cutter.

Relieving movements are imparted to the movable support 30 to back off the gear blank during the return stroke of the cutter through connections which act to break and straighten the toggle links 308 and 310 in timed relation to the operation of the cutter. These connections comprise a cam 350 secured on a shaft 352 which also carries a gear 354 arranged to mesh at all times with the sliding gear 114 on the flywheel shaft 80 through which the reciprocatory cutting movements are imparted to the cutter. A cam groove 356 is formed on the periphery of the cam 350 to receive a cam roll 358 which is carried on one arm of a bell-crank lever 360, the other arm of the lever being connected by means of the link 362 to the central pivot 364 of the toggle links 308 and 310. With this arrangement of the parts, it will be seen that the thrust of the cutter stroke which takes place when the toggle links 308 and 310 are in their straightened position is taken up entirely against the feed member 290, the sleeve 292 and the end thrust bearing 302, and avoids bringing any undue strain on the relieving cam or intermediate connections for backing off the gear blank from the cutter.

In order to limit the rotational movement of the sleeve 292 to bring the gear blank exactly to the required depth through the advancing movement of the feed member 290, and also to arrest the feeding movement of the blank carrier at one or more intermediate points to enable preliminary cuts of intermediate depths to be made, control mechanism is provided for positively stopping the rotation of the sleeve 292. To this end a disk 304 is rigidly secured to the sleeve 292 (see Figs. 2, 7, 8 and 9), and is provided with a stop in the form of an abutment 366 which is arranged to engage with the end of a stop in the form of a rod 368 rigidly positioned in the machine. The rod 368 is mounted for endwise movement in the machine frame, and may be positioned by means of a micrometer adjustment to determine exactly the limit of the advancing movement of the blank carrier with relation to the cutter for the required depth of cut. The mechanism for securing this adjustment of the position of the rod 368, comprises a rotatable sleeve 369 mounted against endwise movement in the machine and screw threaded to the rod 368. A rotatable pin 370 set at right angles to the rod 368 and sleeve 369, is provided at one end with a spiral gear connection for rotating the sleeve to impart endwise movement to the rod 368 which is keyed to prevent rotation therewith. A knurled head formed on the exposed end of the rotatable pin 370 provides an accessible control for the operator, and is arranged to cooperate with a dial 371, so that the exact position of the rod or stop 368, and the consequent depth of feed may be determined directly from the angular position of the rotatable pin 370.

In setting up the machine to operate upon a new gear blank, the sleeve 292 is moved in a reverse direction to carry the abutment 366 on the disk 304 away from the stop 368 a distance exactly equal to the depth of cut which it is desired to make in the gear blank. The position of the work support 30 is then adjusted with relation to the feed mechanism as above described to bring the periphery of the blank into grazing contact with the cutter. To enable the operator quickly and accurately to determine the position to which the sleeve must be turned in a reverse direction in setting up the machine to secure the required depth of cut, an adjustable setting mechanism is provided which comprises a disk 372 loosely mounted to turn on the sleeve 292, and corrugated on one face to engage with corresponding corrugations formed on the face of the fixed disk 304, so that the two disks may be locked to turn as a unit. The disk 372 is also provided with an abutment 374 which is arranged to engage with a fixed stop 376 on the machine frame. In setting up the machine, the disk 372 is set with relation to the fixed disk 304, so that as the sleeve 292 is moved in a reverse direction, the abutment 374 will be brought into engagement with the stop 376, and thus prevent the further reverse movement of the sleeve 292 at a point which will correspond exactly to the distance through which the sleeve 292 must rotate to secure the required depth of cut. The required setting of the disk 372 relatively to the fixed disk 304 is readily determined by means of markings on the disk 372 which are read with reference to a corresponding mark on the disk 304.

Provision is made for stopping the feeding movement of the sleeve 292 at intermediate points to make preliminary cuts, by means of two disks 378 which are loosely mounted to turn on the sleeve 292, and are provided with corrugated faces to enable them to be locked in their adjusted positions relatively to each other and to the sleeve 292. Each of these disks is provided with an abutment 380 which is adapted to engage with a short projecting butt 382 on a stop lever 384 pivoted at 386 on the machine frame. In the operation of the machine, the sleeve 292 will be advanced until one of the abutments 380 engages with the butt 382 of stop lever 384. Further advance of the sleeve 292 is thus arrested and the sleeve remains stationary while the gear blank makes a complete rotation to carry the cutting operation at a uniform depth completely around the periphery of the gear blank. The lever 384 is then rocked to disengage its butt 382 from the abutment 380 and permit the further rotation of the sleeve 292 until the butt 382 comes into contact with the second of the abutments 380 to prevent the further rotation of the sleeve 292 while a second preliminary cut is made in the gear blank. After the completion of the second cutting operation about the gear blank, the lever 384 is again rocked to release the sleeve 292 which is permitted to continue its rotational feeding movement to bring the cutter finally into depth with relation to the gear blank when the further rotational feeding movement of the sleeve is arrested by the engagement of the abutment 366 with the stop rod 368. To lock the disk 372 and the two disks 378 in their adjusted positions relatively to each other, a cover disk 388 is placed over the outer end of the sleeve 292, and is screwed down into clamping engagement with the disks to lock them rigidly to each other and to the fixed disk 304 by means of a bolt 390 which extends through the cover disk 388 and is provided at its inner end with a plug 392 screw threaded into the end of the sleeve 292, and at its outer end with a knurled head 394 to enable the operator readily to manipulate the bolt for clamping and unclamping the disks.

The mechanism for imparting the required rotational movement to the sleeve 292 to feed the gear blank towards the cutter, comprises a vertically arranged bar 396 (see Figs. 2, 7 and 9) having formed thereon a rack 398 which engages with a corresponding gear 400 formed on the disk 390 which as above pointed out is rigidly secured to the periphery of the sleeve 292, so that a vertical movement of the bar upwardly acts to impart to the required rotational feeding movements to the sleeve 292. At its lower end the bar 396 is provided with a piston 402 which is fitted to slide in a chamber 406 to which liquid is admitted under pressure, as will be hereinafter more fully described, to impart the required vertical feeding movements to the bar. At its upper end the bar is supported within a sleeve 408 rigidly secured in the machine, and is normally held in its low position by means of a spring 410 coiled about the bar 396 within the sleeve, and arranged at one end to bear against the upper end of the sleeve, and at its other end to bear against a collar 412 on the bar.

For controlling the operation of the machine to cause a resumption of the feeding operation after the completion of each preliminary cut, and to automatically stop the machine after the completion of the final cut, a timing mechanism is provided which is thrown into operation when the rotational feeding movement of the sleeve 292 is arrested by the engagement of the stop lever 384 with either of the preliminary stop abutments 380 or by the engagement of the stop rod 368 with the abutment 366 as the work is fed into depth, and acts through connections about to be described to bring about the required changes in the operating conditions of the machine. This timing mechanism comprises a rotatable timing cam 414 (see Figs. 2, 3, 9, 11, 15 and 16) which is mounted on the upper end of a vertical shaft or spindle 416 journaled in a bracket 418 which is secured by screws 420 to the open end of a cylinder 422. A piston 424 arranged to slide within the cylinder is mounted on the reduced lower end of the spindle 416, and is secured thereto by means of a nut 426. The cam 414 is rotated, when rendered operative, in timed relation to the rotation of the gear blank through connections which include a gear 428 which is mounted near the upper end of the vertical drive shaft 202 (see Figs. 3 and 16), and engages with a gear 430 formed on a sleeve 432 which is journaled in a bearing 434 concentrically with the axis of the cam 414. A flange 436 threaded to the upper end of the sleeve prevents endwise movement of the sleeve 432 and gear 430 in the bearing. Corresponding clutch members 438 are formed on the adjacent face surfaces of the gear 430 and the cam 414, so that the cam 416 may be clutched to turn with the gear 430. A compression spring 440 mounted in a sleeve or tube 442 journaled within the sleeve 432 is arranged to bear at its upper end against an adjusting screw 444, and at its lower end against the cam 414 to maintain the cam and spindle 416 normally in their retracted position. The spindle 416 and cam 414 are raised against the pressure of the spring 440 to engage the clutch members by introducing liquid into the lower end of the cylinder 422 under sufficient pressure to overcome the force of the spring 440. The hydraulic connections, as will be hereinafter more fully explained, are arranged so that when the upward movement of the bar 396 which actuates the feed sleeve 292 is arrested, the resulting increase of pressure throughout the system increases the upward pressure exerted on the piston 424 sufficiently to overcome the pressure of the spring 440, and raises the spindle 416 and timing cam 414 to engage the clutch members 438, and thus to throw the timing cam into operation.

The timing cam 414 is turned to and held in its rest or starting position with a raised portion of the cam in engagement with a stop or abutment 446 on the frame by means of a cord 448 which is wrapped about and is secured at one end to a pulley 450 formed adjacent the under face of the cam on the spindle 416, the free end of the cord being laid over a pulley 452 at the rear of the machine, and being connected to a tension spring 454 which is fastened to the machine frame. The periphery of the timing cam 414 is provided with two raised cam portions 456 and 458 placed parallel to each other and occupying the same segment of the cam, these raised portions being arranged to engage alternately with a spring-pressed plunger 460. The raised cam portion 456 occupying the lower position has a constant radius and extends around the periphery of the cam through an angle corresponding exactly to the movement of the cam while the gear blank is rotating through 360°, so that during this time the plunger is held in its retracted position. The upper raised cam portion 458 occupying a position parallel to that of the raised cam 456 has a radius which is at one end of the cam equal to that of the raised cam 456, but gradually decreases in radius until at the other end of the cam 458 the radius is equal to that of the low portion of the cam. With this arrangement of the parts, it will be seen that when the cam 414 and spindle 416 are raised into operative position, the spring-pressed plunger 460 will be held in its depressed position at one end of the raised cam 456, and will be held in this position during a rotary movement of the cam 414 corresponding to a 360° rotation of the gear blank when the plunger will drop off the high portion of the cam, thus allowing the mechanisms for resetting the operation of the machine to become operative.

As the pressure in the hydraulic chamber 422 is reduced to its previous level by the resumption of the feeding movement of the bar 396, or is released entirely by the stopping of the machine at the end of the cutting operation, the piston 416 and cam 414 will be retracted under the pressure of the spring 440 to disengage the clutch members 438 and allow the cam 414 to return to its rest position under the influence of the cord 448 and spring 454. The downward movement of the cam 414 to disengage the clutch 438 causes the plunger 460 to be brought into engagement with and ride outwardly on the spiral cam surface 458 as the cam is rotated in a reverse direction to return the plunger 460 to its original retracted position on the high portion of the cam.

The spring-pressed plunger 460 is mounted to slide in a tubular chamber 462 formed in a fixed portion of the machine frame, one end of the chamber being enlarged to receive the head 466 of the plunger and a compression spring 468 which is coiled about the plunger between the end of the enlarged portion of the chamber, and the head of the plunger. This spring at all times maintains the plunger in contact with the cam 414 as above described. At its rear end the plunger is provided with a spring-pressed detent 470 in the form of a rod which is arranged to slide in a guideway formed along the axis of the plunger, and is pressed outwardly by means of a compression spring 472 seated in the base of the recess, and bearing against the end of the detent. In order to limit the backward movement of the detent under the pressure of its spring 472, the projecting end of the detent is reduced in size to form a shoulder which engages with a corresponding shoulder formed on a collar 474 which is screw-threaded to the rear end of the plunger.

The connections controlled by the movement of the plunger 460 toward the center of the timing cam 414 to cause a resumption of the feeding operation after the completion of each preliminary cut about the gear blank, comprise a horizontally arranged lever 476 (see Fig. 9) which is pivotally mounted at 478 intermediate its length on the machine frame, and is connected at one end by a link 480 to the stop lever 384, and at its other end to the lower end of an axially movable vertical control rod 482. A rack 484 formed on the upper end of the control rod 482 is arranged to mesh with a pinion 486 which also engages with a corresponding rack 488 formed on a horizontally situated rod 490. Endwise movements are imparted to the rod 490 and through the pinion 486 to the control rod 482 from the plunger 460 by means of a bell-crank lever 492, (see Figs. 9, 11, 15 and 17), one arm of which is connected through a link 494 to the rod 490, the other arm being connected to the collar 474 on the plunger 460 through the engagement of a pin 496 on the collar with a slot 498 formed in the arm of the bell-crank. With this arrangement of parts it will be seen that whenever the spring-pressed plunger 460 is moved towards the center of the timing cam 414, the butt end of the stop lever 384 will be moved out of line with the preliminary stops 380, and will be again moved into operative position as the plunger is returned to its retracted position.

The connections controlled by the movement of the plunger 460 for stopping the machine at the end of the gear cutting operation, comprise a horizontally arranged shaft 500 (Figs. 2, 9, 11, 15 and 17) which is journaled for endwise and rocking movements in a casing 502 forming a part of the machine frame. At its forward end this shaft is connnected by means of a link 504 to the vertically situated arm of a bell-crank 506 which is pivoted at 508 on the machine. The horizontal arm of the bell-crank is connected to the upper end of a rack bar 510 (see Figs. 1 and 9) which is arranged to control the starting and stopping mechanism of the machine, as will hereinafter be more fully described. A compression spring 512 seated in the rear end of the casing 502 and engaging the rear end of the shaft 500 tends to advance the shaft and depress the rack bar 510 to move the starting and stopping control mechanism to stop position. The bar 500 is normally held in retracted position against the pressure of its spring 512 during the operation of the machine by the engagement of the spring-pressed detent 470 on the spring plunger 460 with an abutment 514 on the bar which rides in a slot in the casing 502. When the spring plunger 460 is permitted to advance by the operation of the timing cam as above described, the detent 470 is moved out of the path of the abutment 514 to permit the shaft 500 to advance under the pressure of its spring to stop the machine.

Inasmuch as it is necessary to maintain the bar 500 in its retracted position to prevent the stopping of the machine when the plunger 460 is advanced to resume the feeding operation upon the completion of a preliminary cut, a movable detent 518 is provided to remain in engagement at this time with a cooperating abutment 520 formed on the under side of the shaft 500. This detent is carried on one arm of a bell-crank lever 522 pivoted at 524 on the machine. In order to permit the abutment 520 to be moved past the detent 518 into locking position when the shaft 500 is retracted in starting the machine, the detent 518 is spring seated in the bell-crank lever 522 (see Fig. 17), and is provided with a cam surface which is engaged by a corresponding cam surface on the rear side of the abutment 520 to depress the detent and permit the shaft and abutment 520 to be moved past the detent 518 into locking position. The bell-crank lever 522 is actuated at the end of the feeding operation to move the detent 518 out of line with the abutment 520, so that the movement of the plunger 460 under the influence of the timing cam 414 at the end of the gear cutting operation, can operate to release the shaft 500 and bring the machine to a stop. The connections for thus actuating the bell-crank lever 522 comprise a horizontally arranged actuating lever 526 (see Fig. 9) pivoted intermediate its length at 528 on the machine frame, and at its forward end arranged to ride on the surface of the disk 304 secured to the feeding sleeve 292. At its rear end the actuating lever 526 is connected to the lower end of an axially movable control rod 530 which is provided at its upper end with a rack 532 arranged to engage with a pinion 534. Movement is imparted from the control rod 530 to the bell-crank 522 to move the detent 518 into and out of operative position by means of a horizontally arranged axially movable member 536 which is connected at its rear end by a link 538 to the free arm of the bell-crank 522, and at its forward end is provided with a rack 540 engaging with the pinion 534. So long as the actuating lever 526 rides on the peripheral surface of the disk 304 during the feeding movement of the sleeve 292 and during the preliminary cutting operations above described, the bell-crank 522 and the detent 518 are maintained in locking position to prevent the advance of the shaft 500 under the pressure of its spring 512. However, as the abutment 366 on the flange 304 is brought into engagement with the stop 368 completing the feeding movements of the sleeve 292, the actuating lever 526 will be raised by contact with the abutment 366, thus causing the detent 518 to be moved out of line with the abutment 520 through the connections described. As the spring-pressed plunger 460 is now advanced by the action of the timing cam 414 withdrawing the detent 470 from the path of the abutment 514, the shaft 500 is free to move under the influence of its spring 512 to stop the machine. The advancing movement of the shaft 500 to stop position is limited by engagement of the abutment 514 with the end of the slot in the casing 502.

In order to permit the operator to stop the machine if desired at any point during the operation, mechanism is provided for rocking the shaft 500 to move the abutments 514 and 520 out of line with the corresponding detents 470 on the plunger and 518 on the bell-crank 522, so that the shaft 500 is permitted to move forward under the pressure of its spring 512 to stop the machine. This mechanism comprises a shaft 542 (see Figs. 9 and 11) mounted parallel and adjacent to the shaft 500, and provided at its rear end with a pinion 544 which meshes with a corresponding pinion 546 on the shaft 500. At its forward end the shaft 542 is provided with a manually controlled lever 548.

The machine herein disclosed as embodying the invention is provided with a liquid pressure control system for stopping and starting the machine, and for controlling the feeding of the gear blank into depth with relation to the cutter. Liquid is supplied under pressure by means of a pump 550 (see Figs. 2, 3 and 9) which is provided with an intake pipe 552 to draw liquid from a sump or reservoir 554 located in the base of the machine. The pump is continuously driven independently of the operation of the machine from the driving pulley 44 (see Fig. 4) by means of a sprocket chain 556 which runs over a sprocket 558 formed on the end of the sleeve 46 carrying the pulley 44, and drives a sprocket 560 on the driving shaft 562 of the pump. The liquid is conducted under pressure from the pump through a pipe 564 to two sleeve valves which are placed one above the other in the machine, the upper one being arranged to control the mechanism for feeding the gear blank to depth with relation to the cutter and the timing mechanism, and the lower valve being arranged to control the starting and stopping mechanism of the machine.

The feed control valve (see Figs. 9 and 10) comprises a central plug or core 566, a sleeve 568 within which the plug is mounted to turn, and a casing 570 within which the sleeve is mounted to turn. Two inlets 572 and 574 and an outlet 575 to the sump are provided in the casing 570 spaced at 90° angles with relation to each other, and arranged alternatively for different positions of the sleeve to connect with corresponding apertures 576 cut through opposite sides of the sleeve. An outlet 578 is provided in the casing 570 to form a continuation of a bore 580 formed axially in the plug 566. Two channels 582 are cut laterally and at right angles to each other from the central bore 580 in the plug to connect with the apertures 576 in the sleeve 568. With the parts in the stop position of the machine as shown in Fig. 10, it will be seen that both inlet passages are closed while a free passage is opened to permit the liquid to escape from the system to the sump through the outlet passage 578. The feeding mechanism may be thrown into operation by a 90° movement of either the sleeve or the plug in a counter-clockwise direction, which movement acts at the same time to open one or the other of the inlet passages and to close the outlet passage 578 to the sump.

The valve for starting and stopping the machine is similar as thus far described in every respect to the valve for the feeding mechanism comprising a central plug 584, and a sleeve 586 mounted to turn in the casing 570 with the inlets and outlets arranged in a similar manner, so that starting from the stop position as shown in Fig. 10, a 90° turn of either the plug or the sleeve in a counter-clockwise direction will open up one or the other of the inlet passages for the liquid under pressure from the pump the starting and stopping pressure cylinder, and will at the same time close the outlet to the sump.

Liquid is conducted under pressure from the outlet 578 of the feed valve through a pipe 588 which has two branches, one leading to the feed cylinder 406 for advancing the rack bar 398 and the feed member 290, and the other leading to the pressure cylinder 422 for the timing mechanism. A corresponding outlet for the stopping and starting valve is connected by a pipe 590 to the pressure cylinder 76 for starting and stopping the machine. A pipe 592 carries liquid released through the outlet 575 and the corresponding outlet in the starting and stopping valve back to the sump. Three manually operable control levers 594, 596 and 598 are mounted one above the other on the front of the machine to control the operation of the two valves for controlling the feeding operation and the starting and stopping of the machine. The topmost lever 594 is connected to rotate the central portion or plug 566 of the feed valve to enable the operator to control the feeding of the work by hand. The middle lever 596 is connected to rotate the central portion or plug 584 of the valve for controlling the starting and stopping of the machine, and is arranged to allow the operator manually to control the operation of the starting and stopping clutch. The third or bottom lever 598 is connected to a pinion 600 which engages with the lower end of the rack 510 which also engages with pinions 602 and 604 formed respectively on the sleeves 568 and 586 of the two valves, so that a movement of the lever 598 about its pivot will operate by imparting a lengthwise movement to the rack to cause a corresponding movement of the two sleeves simultaneously to open or closed position. During the automatic operation of the machine, the levers 594 and 596 for manually controlling the feed mechanism and the starting and stopping clutch, normally occupy their stop positions to the right as shown in Fig. 1. In starting the machine, the lever 598 which for convenience may be designated the automatic starting lever, is moved to the left as shown in Fig. 1 to raise the rack 510 and rotate the valve sleeves 568 and 586 in a counter-clockwise direction as viewed in Figs. 1 and 10, to open position. The parts are automatically held in this position against the pressure of the spring 512 bearing on the end of the bar 500 connected to the upper end of the rack bar 510 by locking engagement of the stops 514 and 520 on the bar 500 with the corresponding spring detents 470 and 518 as above described. From an inspection of the detail Fig. 10 of the drawings, it will be seen that the movement of the hand control levers 594 and 596 to rotate the plugs 566 and 584 to operative position, serves to open a passage for the liquid under pressure through the upper inlet 572 to each valve, while the movement of the automatic control lever 598 to move the sleeves 568 and 586 to operative position serves to open the laterally placed inlets 574 to the valves.

In order to determine within narrow limits the rate of feed of the gear blank towards the cutter during the automatic operation of the machine, a needle valve is located in the inlet 574 from the pump, as shown in Fig. 10, to regulate the effective pressure exerted on the piston as the rack bar 396 is advanced to feed the gear blank towards the cutter. This valve comprises a shaft 606 which is screw threaded into the casing of the machine, and carries a valve head 608 which is seated against a corresponding surface 610 in the casing. The setting of this valve is controlled by means of a rotatable shaft 612 which is provided with a knurled head 614, so that it may be readily turned by the operator, and at its rear end carries a worm 616 engaging with a corresponding worm gear 618 formed on the shaft 606.

The operation of the machine has been indicated in the preceding description, but may be briefly summarized as follows:—When the machine is to be set up for a cutting operation on a gear blank, the operator adjusts the position of the setting mechanism for the feed to give the desired pitch to the gear teeth, and to determine the depth of the preliminary cuts to be made in the gear blank. The disk 372 as shown in Figs. 2 and 9, is moved in a counter-clockwise direction to a position with relation to the fixed disk 304 in accordance with the markings on the disk 372 which indicate the pitch desired. The distance from the abutment 374 on the disk 372 to the stop 376 will then represent the turning movement of the feeding sleeve 292 required to advance the gear blank from a point in grazing contact with the cutter into the desired depth. The disks 378 are then arranged with relation to each other and to the disk 304 fixed to the sleeve 292 to cause their abutments 380 to come into engagement with the butt 382 of the stop lever 384 at intermediate points during the rotational feeding movement of the sleeve 292. The disk 372 and the disk 378 are now rigidly clamped in position with relation to the disk 304 and sleeve 292 by tightening up the nut 394 above described. In order to place the gear blank in position on the work spindle, the operator now depresses the lever 334 to permit the work support 30 to be swung freely about its pivot clear of the other operating parts of the machine, and then after the blank has been secured in place, moves the work support inwardly to bring the gear blank approximately into grazing contact with the cutter 24. In order to secure a finer adjustment of the work support 30 and gear blank with relation to the cutter than would otherwise be possible due to the size of the engaging teeth 324 and 325 of the clutch members, the worm 346 may now be rotated to bring the support 30 and gear blank exactly into position for grazing contact with the cutter.

In order to determine the peripheral speed of the rotational movements of the gear blank and the cutter in accordance with the requirements of the work, two change speed gears 204 and 206 (Fig. 4) arranged to produce the required ratio are secured on the ends of the shafts 192 and 186.

Since the relative rates of rotation of the cutter spindle and the work spindle must be selected with relation to the relative diameters of the cutter and the gear blank being operated upon, a set of change speed gears as indicated at 228 and 230 in Fig. 3, are provided in the driving connections to the cutter spindle, which are chosen to produce a substantially equal peripheral speed between the cutter and the gear blank at the point of contact.

With the machine set up as thus set forth, the operator moves the automatic control lever 598 to the left as viewed in Fig. 1 to start the machine. This movement of the control lever acts to raise the rack 510 to open the feed valve and the valve for operating the starting and stopping clutch, the rack being held in this position against the pressure of the spring 512 by the locking engagement of the spring detents 470 and 518 with the corresponding abutments 514 and 520 on the control bar 500. Liquid is now permitted to flow under pressure through the starting and stopping control valves to the pressure cylinder 76 to throw the driving clutch to simultaneously release the brake band 162 from the flywheel 78 and to move the clutch 54 into driving engagement with the driving pulley 44, so that relative rotational movements are imparted to the cutter and the gear blank, and a reciprocatory cutting movement is imparted to the cutter. At the same time liquid under pressure is permitted to flow through the feed valve to the pressure cylinder 406 to advance the feeding sleeve 292 and move the work support 30 and gear blank gradually into feeding engagement with the cutter. The feeding movement of the cutter blank towards the cutter continues as the point of cutting operation progresses around the gear blank until the further feeding movement of the sleeve 292 and feed member 390 is arrested by the engagement of the butt 382 of the stop lever 384 with one of the abutments 380 on the corresponding disk 378 for the first preliminary cut. The increased pressure in the system brought about by the cessation of the feeding movement, causes the piston 424 and timing cam 414 to be raised bringing the clutch members 438 into operative engagement to rotate the timing cam in timed relation to the rotation of the gear blank, so that after a complete revolution of the gear blank from the point at which the feeding movement was stopped, the spring-pressed plunger 460 will ride off the high portion of the cam surface 456. This movement of the plunger 460 acts through the connections above described to move the stop lever 384 out of the path of the abutment 380, and permits the continued feeding movement of the sleeve 292 and feed member 290. As the feeding movement progresses with the advance of the piston 402, the pressure in the system is automatically reduced to a point where the cam 414 is depressed under the pressure of its spring 440 to disconnect the clutch members 438, so that the cam 414 is permitted to return to its rest position against the stop 446 under the influence of the spring 454, causing the spring-pressed plunger 460 to be advanced to its normal position riding on the cam surface 458, and returning the stop lever 384 into the path of the second abutment 380. When the feeding operation has progressed to a point where the abutment 380 comes into engagement with the butt 382 of the stop lever 384, the same cycle of operations is repeated to form the second preliminary cut in the gear blank, and the feeding movement of the sleeve 292 and feed member 290 is again permitted to continue until the abutment 366 on the disk 304 comes into engagement with the stop bar 368 to finally determine the depth of cut. The increased pressure in the system again acts to throw the timing cam into operation, as above described. The movement of the plunger 460 toward the timing cam 414 after a complete revolution of the gear blank from the point at which the feeding operation was thus finally terminated is rendered effective to release the bar 500 which is now permitted to advance under the pressure of its spring 512 to depress the rack 510 to shut off the control valves and stop the machine. The movement of the plunger 460 toward the center of the timing cam 414 as the plunger rides off the raised surface 456, causes the spring detent 470 carried on the rear end of the plunger to be moved out of locking engagement with the abutment 514 on the bar 500. During each of the preliminary cuts, however, the bar 500 is maintained in its retracted position by the engagement of the spring detent 518 carried on the bell-crank lever 522 with the abutment 520 on the bar 500. As the sleeve 292 and feed member 290 are brought to their final advanced position, the lever 526 engaging with the periphery of the disk 304 is rocked by engagement with the abutment 366 on the disk 304 to rock the bell-crank 522 about its pivot and move the spring detent 518 out of line with the abutment 520, so that the advancing movement of the plunger 460 after a complete revolution of the gear blank is rendered operative by moving the spring detent 470 out of engagement with the abutment 514 to permit the advance of the bar 500 under the pressure of the spring 512 to stop the machine.

The invention having been described, what is claimed is:

1. A gear generating machine having, in combination, a work support adapted to carry a work blank, a gear-shaped planing cutter, means for imparting a relative reciprocatory cutting movement to the cutter and the blank, means for imparting relative rotational movements to the cutter and blank adapted to maintain a substantially equal peripheral speed at the point of cutting contact, a support fixed against movement laterally of said cutting movements on which one of said work support and cutter elements is carried, a support for the other of said elements adapted for movement laterally about a fixed pivot to move the cutter and work blank relatively into and out of operative engagement, means for moving the latter support about its pivot to impart a relative feeding movement to the cutter and work support into operative engagement, means for imparting an additional relieving movement to the support about its pivot to slightly separate the cutter and work blank for each relative return stroke of the cutter and blank, and means acting during said relieving movement to modify the relative rotational positions of gear blank and cutter.

2. A gear generating machine having, in combination, a work support adapted to carry a gear blank, a gear shaped planing cutter, means for imparting a relative reciprocatory cutting movement to the cutter and the blank, means for imparting relative rotational movements to the cutter and blank adapted to maintain a substantially equal peripheral speed at the point of cutting contact, a support fixed against movement laterally of said relative cutting movements on which one of said work support and cutter elements is carried, a support for the other of said elements adapted for rotational movement laterally about a fixed pivot to move the cutter and gear blank relatively into and out of operative engagement, means for turning the latter support about its pivot to impart a relative feeding movement to the cutter and work support into operative engagement, and means for imparting an additional turning movement to the latter support to slightly separate the cutter and work blank for each relative return stroke of the cutter and blank.

3. A gear generating machine having, in combination, a gear shaped planing cutter, a support on which the cutter is mounted for reciprocatory cutting movements across the face of a gear blank, a work spindle on which the gear blank is supported, a support on which the work spindle is carried pivotally mounted on a fixed pivot to permit movements of the gear blank toward and away from the cutter, and mechanism for imparting relative rotational movements to the cutter and to the work spindle to maintain a substantially equal peripheral speed of the cutter and work blank including a member mounted co-axially with the pivot rotatable to transmit the said rotational movements to the work spindle.

4. A gear generating machine having, in combination, a gear shaped planing cutter, a work spindle for supporting a gear blank, means for imparting relative reciprocatory cutting movements to the cutter and the blank, a support for one of said work spindle and cutter elements, a support for the other of said elements pivotally mounted on a fixed pivot to permit movement of the cutter and blank relatively into and out of cutting engagement, and driving mechanism for imparting rotational movements to the cutter and spindle arranged to maintain a substantially equal peripheral speed between the cutter and the gear blank, said mechanism including a rotational member mounted co-axially with the said pivot for transmitting rotational movements to the one of said elements mounted on the said rotatable support.

5. A gear generating machine having, in combination, a gear shaped planing cutter, a work spindle for supporting a gear blank, means for imparting relative reciprocatory cutting movements to the cutter and the blank, a support for one of said work spindle and cutter elements, a support for the other of said elements pivotally mounted to permit movement of the cutter and blank relatively into and out of cutting engagement, means for imparting a relieving movement to said support about its pivot for each cutter stroke, and driving mechanism for imparting rotational movements to the cutter and spindle arranged to maintain a substantially equal peripheral speed between the cutter and the gear blank, including a drive shaft mounted co-axially with said support, and driving connections from said shaft arranged to transmit rotational movements to the one of said elements mounted on said rototable support and actuated by said rotational relieving movements of the support to correspondingly modify the relative rotational positions of said elements.

6. A gear generating machine having, in combination, a gear shaped planing cutter, a work spindle for supporting a gear blank, means for imparting relative reciprocatory cutting movements to the cutter and the blank, a support for one of said cutter and work spindle elements, a support for the other of said elements pivotally mounted to permit relative movement of the cutter and blank towards and from each other, and driving mechanism for imparting rotational movements to the cutter and spindle arranged to maintain a substantially equal peripheral speed of the cutter and the gear blank, said mechanism including a driving shaft mounted co-axially with said pivoted support, and a compensating idler connection for imparting rotational movements from said shaft to the one of said elements mounted on the movable support.

7. A gear generating machine having, in combination, a gear shaped planing cutter, a work spindle for supporting a gear blank, means for imparting relative reciprocatory cutting movements to the cutter and the blank, a support for one of said cutter and work spindle elements, a support for the other of said elements pivotally mounted to permit movement of the cutter and blank relatively into and out of cutting engagement, mechanism for moving said pivotally mounted support about its pivot to cause the cutter to be fed relatively toward the work, means for imparting a relieving movement to said support for each cutter stroke, and driving mechanism for imparting rotational movements to the cutter and spindle arranged to maintain a substantially equal peripheral speed between the cutter and gear, said mechanism including a driving shaft mounted co-axially with said pivoted support, and a compensating idler gear for driving the one of said elements mounted on the movable support from said vertical driving shaft arranged to modify the relative rotational positions of the cutter and gear blank during each relieving movement.

8. A gear generating machine having, in combination, a gear shaped planing cutter, a work spindle arranged to carry a gear blank, means for imparting a reciprocatory cutting movement to the cutter transversely of the blank, a support for the work spindle mounted to swing about a fixed pivot to move the gear blank toward and away from the cutter, means for imparting a relieving movement to said support about its pivot for each cutter stroke, and driving mechanism for imparting rotational movements to the cutter and spindle arranged to maintain a substantially equal peripheral speed between the cutter and the gear blank, said mechanism including driving connections for rotating the work support controlled by the rotational relieving movement of said support to correspondingly modify the rotational position of the gear blank with relation to the cutter.

9. A gear generating machine having, in combination, a gear shaped planing cutter, a work spindle arranged to carry a gear blank, means for imparting a reciprocatory cutting movement to the cutter transversely of the blank, a support for the work spindle mounted to swing laterally about a fixed pivot to move the gear blank toward and away from the cutter, and driving mechanism for imparting rotational movements to the cutter and spindle arranged to maintain a substantially equal peripheral speed between the cutter and the gear blank, said mechanism including a driving shaft mounted co-axially with said pivoted support, a gear train for imparting rotational movements to the cutter from said shaft, and compensating gear connections for imparting rotational movements to the work spindle from said shaft.

10. A gear generating machine having, in combination, a gear shaped planing cutter, a work spindle arranged to carry a gear blank, means for imparting a reciprocatory cutting movement to the cutter transversely of the blank, a support for the work spindle mounted to swing laterally about a fixed pivot to move the gear blank toward and away from the cutter, and driving mechanism for imparting rotational movements to the cutter and spindle arranged to maintain a substantially equal peripheral speed between the cutter and the gear blank, said mechanism including a driving shaft mounted co-axially with said pivoted support, means including change speed gears for actuating said driving shaft, a train of mechanism including change speed gears for imparting rotational movements to the cutter from the said shaft, and compensating gear connections for imparting rotational movements to the work spindle from the said shaft.

11. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and blank adapted to maintain a substantially equal peripheral speed at the point of cutting contact, a support fixed against movement laterally of said relative cutting movements on which one of said work spindle and cutter elements is carried, a support for the other of said elements arranged to move laterally about a fixed pivot to bring the cutter and gear blank relatively into and out of operative engagement, and means for moving the latter support about its pivot comprising a toggle connection having one arm anchored on the machine and the other arm connected to actuate the said pivoted support, the parts being arranged upon straightening the toggle to move the cutter and gear blank relatively into cutting engagement, and mechanism for breaking and straightening the toggle.

12. A gear generating machine having, in combination, a work support adapted to carry a work blank, a gear shaped planing cutter, means for imparting a relative reciprocatory cutting movement to the cutter and the blank, means for imparting relative movements to the cutter and blank adapted to maintain a substantially equal peripheral speed at the point of cutting contact, a support fixed against movement laterally of said relative cutting movements on which one of said work support and cutter elements is carried, a support for the other of said elements adapted for movement laterally to move the cutter and gear blank relatively into and out of operative engagement, and means for moving the latter support laterally comprising a non-rotatable screw threaded member, a nut threaded on said member fixed against lengthwise movement in the machine, and a toggle connection between said member and the movable support, the parts being arranged upon straightening the toggle to move the cutter and gear blank relatively toward each other, mechanism for rotating the nut to feed the gear blank and cutter relatively into operative relationship, and means for breaking and straightening the toggle to secure a relieving action between the cutter and the work.

13. A gear generating machine having, in combination, a work support adapted to carry a work blank, a gear shaped planing cutter, means for imparting a relative reciprocatory cutting movement to the cutter and the blank, means for imparting relative movements to the cutter and blank adapted to maintain a substantially equal peripheral speed at the point of cutting contact, a support on which one of said work support and cutter elements is carried, a support for the other of said elements movable in a predetermined path laterally of said relative cutting movements to bring the cutter and gear blank into and out of operative engagement, and means for actuating said movable support to move the cutter and gear blank into engagement comprising a non-rotatable screw threaded member arranged for movement lengthwise to actuate the movable support, a rotatable sleeve fitted to the screw threaded member and supported against endwise movement in the machine, a stop for limiting the rotation of the sleeve in one direction to determine the limit of the advancing movement of the cutter relatively to the work, a stop adjustable relatively to the sleeve for limiting the movement of the sleeve in an opposite direction to determine the depth of feed and an indicator device for indicating the position of said adjustable stop to set said device for initially determining the depth of feed.

14. A gear generating machine having, in combination, a work spindle adapted to carry a work blank, a gear shaped planing cutter, means for imparting a relative reciprocatory cutting movement to the cutter and the blank, means for imparting relative movements to the cutter and blank adapted to maintain a substantially equal peripheral speed at the point of cutting contact, a support on which one of said work spindle and cutter elements is carried, a support for the other of said elements movable in a predetermined path laterally of said relative cutting movements to bring the cutter and gear blank into and out of operative engagement, and means for actuating said movable support to move the cutter and gear blank into engagement comprising a non-rotatable screw-threaded member arranged for movement lengthwise to actuate the movable support, a rotatable sleeve fitted to the screw-threaded member and supported against endwise movement in the machine, a fixed stop, an abutment on the sleeve arranged to engage therewith to limit the rotation of the sleeve in one direction to determine the limit of the advancing movement of the cutter relatively to the work, a fixed abutment, and a corresponding stop adjustably secured to the sleeve for engagement with said latter abutment to limit the movement of the sleeve in an opposite direction to determine the depth of feed, and an indicator device for indicating the position of said adjustable stop on the sleeve to initially determine the depth of feed.

15. A gear generating machine having, in combination, a work support adapted to carry a work blank, a gear shaped planing cutter, means for imparting a relative reciprocatory cutting movement to the cutter and the blank, means for imparting relative movement to the cutter and blank adapted to maintain a substantially equal peripheral speed at the point of cutting contact, a support on which one of said work support and cutter elements is carried, a support for the other of said elements movable in a predetermined path laterally of said relative cutting movements to bring the cutter and gear blank into and out of operative engagement, and means for actuating said movable support to move the cutter and gear blank into engagement comprising a non-rotatable screw threaded member arranged for movement lengthwise to actuate the movable support, a rotatable sleeve fitted to the screw threaded member and supported against endwise movement in the machine, a stop on the sleeve, an abutment on the machine frame adjustable to determine the final depth of cut, a second abutment on the machine frame, a feed setting stop dial arranged to engage with said second abutment rotatably mounted on the sleeve for adjustment to determine the limit of movement of the sleeve in a reverse direction to measure the depth of cut, a pawl, an auxiliary stop dial arranged to engage with said pawl rotatably mounted on the sleeve for adjustment to limit the depth of feed for a preliminary cutting operation, and means for locking said dials to move with the sleeve.

16. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and blank adapted to maintain a substantially equal peripheral speed at the point of cutting contact, a support on which one of said elements is carried, a support for the other of said elements movable in a predetermined path laterally of said relative cutting movements to bring the cutter and gear blank relatively into and out of operative engagement, and means for actuating said movable support to move the cutter and gear blank into engagement comprising a non-rotatable screw threaded member arranged for movement lengthwise to actuate the movable support, a rotatable sleeve fitted to the screw threaded member and supported against endwise movement in the machine, and a clutch connection between said member and the movable support operable to disconnect said member and support to permit the support to move freely towards and from the other support.

17. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and blank adapted to maintain a substantially equal peripheral speed at the point of cutting contact, a support fixed against movement laterally of said relative cutting movements on which one of said elements is carried, a support for the other of said elements movable in a predetermined path laterally of said relative cutting movements to bring the cutter and gear blank relatively into and out of operative engagement, and means for actuating said movable support to move the cutter and gear blank into engagement comprising a non-rotatable screw threaded member arranged for lengthwise movement to actuate the movable support, a rotatable sleeve fitted to the screw threaded member and supported against endwise movement in the machine, an abutment on the machine frame, a stop on the sleeve adapted to engage with the abutment to limit the rotation of the sleeve in one direction to determine the maximum relative approaching movement of the cutter and gear blank, a second abutment on the machine frame, a stop on the sleeve to engage with the latter abutment adjustable to determine the limit of movement of the sleeve in an opposite direction for measuring the depth of the cut, auxiliary stops adjustable for arresting the feeding movement of the sleeve at intermediate points, and an adjustable connection between the said member and the movable support to bring the gear blank and the cutter into operative relationship.

18. A gear generating machine having, in combination, a gear shaped planing cutter, a work spindle arranged to carry a gear blank, means for imparting a reciprocatory cutting movement to the cutter transversely of the blank, a support for the work spindle mounted to swing laterally of said cutting movement about a fixed pivot to move the gear blank toward and away from the cutter, mechanism for imparting rotational movements to the cutter and spindle arranged to maintain a substantially equal peripheral speed between the cutter and the gear blank, and mechanism for actuating the support to move the gear blank towards and away from the cutter comprising a gear segment formed on the support, a gear meshing therewith adapted to turn about a stationary pivot, a feed member adapted for endwise movement to rotate the gear, a sleeve threaded to turn on said member and fixed against endwise movement in the machine frame, and means for rotating said sleeve to impart an endwise movement to the feed in member.

19. A gear generating machine having, in combination, a gear shaped planing cutter, a work spindle arranged to carry a gear blank, means for imparting a reciprocatory cutting movement to the cutter transversely of the blank, a support for the work spindle mounted to swing laterally of said cutting movement about a fixed pivot to move the gear blank toward and away from the cutter, mechanism for imparting rotational movements to the cutter and spindle arranged to maintain a substantially equal peripheral speed between the cutter and the gear blank, and mechanism for actuating the support to move the gear blank towards and away from the cutter comprising a gear segment formed on the support, a gear meshing therewith adapted to turn about a stationary pivot, a non-rotatable feed member adapted for endwise movement to rotate the gear, a sleeve threaded to turn on said member and fixed against endwise movement in the machine frame, means for rotating said sleeve to impart an endwise movement to the feed member and gear blank, and a clutch connection to disengage the gear from said member to permit free movement of the support about its pivot.

20. A gear generating machine having, in combination, a gear shaped planing cutter, a work spindle arranged to carry a gear blank, means for imparting a reciprocatory cutting movement to the cutter transversely of the blank, a support for the work spindle mounted to swing laterally of said cutting movement about a fixed pivot to move the gear blank toward and away from the cutter, mechanism for imparting rotational movements to the cutter and spindle arranged to maintain a substantially equal peripheral speed between the cutter and the gear blank, feed mechanism including driving connections for turning the work support about its pivot to move the gear blank into cutting engagement with the cutter, and a clutch connection operable to disconnect the feed mechanism including said driving connections from the support to permit the support to swing freely about its pivot.

21. A gear generating machine having, in combination, a work spindle adapted to carry a gear blank, a gear shaped planing cutter, mechanism including a fly wheel for imparting a relative reciprocatory cutting movement to the cutter and the blank, means for imparting relative rotational movements to the cutter and blank adapted to maintain a substantially equal peripheral speed at the point of cutting contact, supports on which said work spindle and cutter are mounted relatively movable laterally of said cutting movements to bring the cutter and gear blank into and out of operative engagement, a main clutch through which power is transmitted to the machine including the fly wheel, a braking mechanism for arresting the rotation of the fly wheel, and stop mechanism for the machine acting when rendered operative simultaneously to disconnect the clutch and apply the brake.

22. A gear generating machine having, in combination, a work spindle adapted to carry a gear blank, a gear shaped planing cutter, mechanism including a fly wheel for imparting a relative reciprocatory cutting movement to the cutter and the blank, means for imparting relative rotational movements to the cutter and blank adapted to maintain a substantially equal peripheral speed at the point of cutting contact, supports on which said elements are mounted relatively movable laterally of said cutting movements to bring the cutter and gear blank into and out of operative engagement, a main clutch through which power is transmitted to the machine including the flywheel, a braking mechanism for arresting the rotation of the flywheel, and connections between the clutch and the brake acting when the clutch is closed to release the brake and upon opening the clutch, to set the brake, and a stop mechanism rendered operative automatically at the end of the cutting operation on a blank to simultaneously disengage the clutch and set the brake.

23. A gear generating machine having, in combination, a work spindle adapted to carry a gear blank, a gear shaped planing cutter, means for imparting a relative reciprocatory movement to the cutter and blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, means for imparting relative movements to said supports to relieve the cutter after each cutting stroke, and means for relatively actuating said supports to feed the cutter into depth and for holding the supports in said position during a complete revolution of the cutting operation about the gear blank comprising means actuated by continuously applied hydraulic pressure for relatively advancing said supports, a stop for positively limiting the relative advancing movements of said supports by fluid pressure to secure a predetermined depth of cut during the continued relative rotation of the cutter and blank, and timing mechanism acting automatically after a complete revolution of the cutting operation about the gear blank at depth to exhaust said hydraulic pressure to relatively disengage the cutter and blank.

24. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted one of said supports being movable laterally of said cutting movements to bring the cutter and gear blank into and out of operative engagement, driving connections including a worm for imparting feeding movements to said movable support, and a fluid pressure control system to control the relative feed movements of said supports comprising means operated by fluid pressure and acting through said worm to advance said support to relatively advance the cutter and blank into depth during the continued rotation of the cutter and blank.

25. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, means for imparting relative movements to said supports to feed the cutter into the blank, means for imparting additional relative movements to said supports to relieve the cutter after each cutting stroke, a fluid pressure control system arranged by application of fluid pressure to actuate said feeding means to advance the cutter with relation to the blank, and a stop for positively limiting the advance of said supports by said fluid pressure to secure a predetermined depth of cut during the continued relative rotation of the cutter and blank.

26. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system to control the relative feed movements of said supports comprising mechanism operated by fluid pressure to relatively advance the supports to bring the cutter into cutting engagement with the blank, means for controlling the application of the fluid pressure to determine the rate of feed, and a stop for positively limiting the advance of said supports to secure a predetermined depth of cut during the continued relative rotation of the cutter blank.

27. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system to control the relative feed movements of said supports comprising mechanism operated by fluid pressure to relatively advance the blank and cutter into depth during the continued rotation of the cutter and blank, and means for controlling the application of the fluid pressure to determine the rate of feed.

28. A gear generating machine having, in combination, a work spindle adapted to carry a gear blank, a gear shaped planing cutter, means for imparting a relative reciprocatory movement to the cutter and blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system for controlling the feeding movements of one of said supports relatively to the other comprising a feed member, a stop for positively limiting the movement of said feed member to determine the final depth of feed, a preliminarily stop for positively limiting the movement of said feeding member at an intermediate point, mechanism actuated by fluid pressure tending continuously to advance said feed member against the preliminary stop, and means acting after the cutting operation has continued completely around the gear blank to remove the preliminary stop and permit the continued advance of the feed member.

29. A gear generating machine having, in combination, a work spindle arranged to carry a gear blank, a gear shaped planing cutter, means for imparting a relative reciprocatory cutting movement to the cutter and the blank, means for imparting relative rotational movements to the cutter and the blank arranged to maintain a substantially equal peripheral speed at the point of cutting contact, supports on which work spindle and cutter are mounted relatively movable laterally of said cutting movements to bring the cutter and gear blank into and out of operative engagement, and a fluid pressure control system for the machine comprising a fluid pressure supply line, a branch pressure line arranged to control the starting and stopping of the machine, a branch pressure line arranged to control the operation of feeding the work relatively to the cutter, a starting and stopping valve arranged to control said means for imparting relative reciprocating cutting movements and said rotational movements to the cutter and blank, a feed control valve, and independently operable valve means for controlling both the feed and said starting and stopping mechanism.

30. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and fluid operated means to control the relative feed movements of said supports comprising a feed member, a stop for positively limiting the advance of said feed member by fluid pressure to secure a predetermined depth of cut during the continued relative rotation of the cutter and blank, a fluid operated piston for actuating the feed member, a source from which fluid pressure is obtained, a conduit for transmitting fluid pressure from said source to the piston, and a regulating valve in said conduit to determine the rate of feed.

31. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and fluid pressure control mechanism to control the relative feed movements of said supports during said relative rotational movements of the cutter and blank comprising a feed member, a stop for positively limiting the advance of said feed member to secure a predetermined depth of cut, a fluid operated piston for actuating the feed member, a source from which the fluid pressure is obtained, a conduit for transmitting fluid pressure from said source to the piston, an exhaust conduit, and a feed valve for controlling the application of said liquid pressure to feed and to maintain the cutter and blank in the operating position controlled by the stop, and upon exhausting the pressure to cause said cutter and blank to move relatively out of operative engagement.

32. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a liquid pressure control system for controlling the operation of the machine comprising mechanism operated by liquid pressure to relatively advance the supports to bring the cutter into cutting engagement with the blank, means for positively stopping the relative feeding movements of the supports, a stop mechanism for the machine, and a timing mechanism rendered operative by the increase of the liquid pressure in the system upon cessation of the feeding movement to render said stop mechanism operative to stop the machine after the cutting operation has continued completely around the gear blank.

33. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a liquid pressure control system for controlling the operation of the machine comprising mechanism operated by liquid pressure to relatively advance the supports to bring the cutter into cutting engagement with the blank, means for positively stopping the relative feeding movements of the supports, and a timing mechanism rendered operative by the increase of liquid pressure in the system upon cessation of the feeding movement to insure the continuation of the cutting operation completely around the blank.

34. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a liquid pressure control system for controlling the operation of the machine comprising mechanism operated by liquid pressure to relatively advance the supports to bring the cutter into cutting engagement with the blank, means for positively stopping the relative feeding movements of the supports, a timing mechanism to insure the continuation of the cutting operation completely around the blank, a clutch connection for operating the timing mechanism in timed relation to the rotation of the gear blank, a liquid pressure controlled member tending to close said clutch connection, spring means for maintaining said clutch connection open during the feeding movement arranged to permit the closing of the clutch under the increased liquid pressure brought about by the cessation of feeding.

35. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a liquid pressure control system for controlling the operation of the machine comprising a feed member, means for positively limiting the advance of said feed member to secure a predetermined depth of cut, a piston operated by liquid pressure for actuating the feed member, a source from which the liquid pressure is obtained, a timing mechanism to insure the continuation of the cutting operation completely around the blank, a clutch connection operated by liquid pressure for connecting the timing mechanism to operate in timed relation to the rotation of the gear blank, a conduit for transmitting the liquid under pressure from said source to the piston and to the clutch, a needle valve in said conduit to regulate the rate of feed, and means tending normally to hold the clutch in open position against the liquid pressure arranged to permit the engagement of said clutch under the increased pressure resulting from the arresting of the further advance of the feed member.

36. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, a flywheel, a main clutch through which power is transmitted to the machine including the flywheel, a braking mechanism for arresting the rotation of the flywheel, spring means acting on said connections to open the clutch and apply the brake, a piston operated by liquid pressure for actuating said connections against the pressure of the spring to close the clutch and release the brake, a continuously operated pump for supplying liquid under pressure, a conduit from the pump to the piston, and a valve in said conduit arranged alternatively to apply or release pressure to or from the piston.

37. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and liquid operated means for controlling the operation of the machine comprising a feed member, connections for actuating the feed member by liquid pressure to advance the supports relatively to bring the cutter and blank into cutting engagement, a preliminary stop for positively limiting the advancing movement of the feed member, a second stop for finally limiting the advancing movement of the feed member to determine the depth of cut, a timing mechanism, a device controlled by liquid pressure for connecting the timing mechanism to operate in timed relation to the rotation of the gear blank, a source from which liquid pressure is secured, a conduit for supplying liquid under pressure from the source, means normally acting on said device to hold the timing mechanism inoperative arranged to permit the timing mechanism to be made operative under the increased pressure resulting from the arresting of the advance of the feed member, and connections controlled by the timing mechanism upon engagement of the feed member with the preliminary stop to remove the preliminary stop after the rotation of the gear blank has been continued through 360 degrees.

38. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a liquid pressure control system for controlling the operation of the machine comprising a feed member, connections for actuating the feed member by liquid pressure to advance the supports relatively to bring the cutter and blank into cutting engagement, a preliminary stop for positively limiting the advancing movement of the feed member, a second stop for finally limiting the advancing movement of the feed member to determine the depth of cut, a timing mechanism, a device controlled by liquid pressure for connecting the timing mechanism to operate in timed relation to the rotation of the gear blank, means normally acting on said device to hold the timing mechanism inoperative arranged to permit the timing mechanism to be made operative under the increased pressure resulting from the arresting of the advance of the feed member, connections controlled by the timing mechanism upon engagement of the feed member with the preliminary stop to remove the preliminary stop after the rotation of the gear blank has been continued through 360°, and connections controlled by the timing mechanism and rendered operative upon engagement of the feed member with the final stop to stop the machine after the rotation of the gear blank has been continued 360°.

39. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, mechanism for imparting a relative feeding movement to the supports, a timing mechanism to ensure the continuation of the cutting operation completely around the blank after the feeding movement has stopped comprising a cam, a cam follower, clutch connections for rotating the cam in timed relation to the rotation of the gear blank, means acting automatically to move the cam axially to engage the clutch connections, the said parts being arranged to render the follower operative at the end of 360° rotation of the gear blank, and means acting automatically upon said movement of the follower to move the cam axially to disengage the clutch and return the cam and follower to their starting positions.

40. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, mechanism for imparting a relative feeding movement to the supports, a timing mechanism comprising a spring-pressed cam follower, a cam disk cooperating therewith, clutch connections through which the cam is rotated in timed relation to the rotation of the gear blank, means rendered operative upon the stopping of the relative feeding movements of the supports for advancing the cam disk axially to close the clutch, means tending to rotate the disk in a reverse direction to starting position when disconnected from said clutch mechanism, a cam surface formed on the periphery of the disk comprising a raised sector adapted in the advanced position of the cam disk axially to maintain the follower in a retracted position during the rotation of the disk through an arc corresponding to 360° rotation of the gear blank, and a second cam surface formed on the same circumferential portion of the cam disk adapted in the inoperative position of the disk axially to engage with and retract the follower from an advanced position to the retracted position during a reverse rotation of the disk to starting position.

41. A gear generating machine having, in combination, a work spindle adapted to carry a gear blank, a gear shaped planing cutter, a cutter spindle, means for imparting a relative reciprocatory cutting movement to the cutter and the blank, driving connections for imparting relative rotational movements to the cutter and work spindles arranged to maintain a substantially equal peripheral speed of the cutter and blank at the point of cutting contact, supports on which said spindles are mounted relatively movable laterally of said cutting movements to bring the cutter and gear blank into and out of operative engagement, a differential gear connection in said driving connections to permit an adjustment of the peripheral surface of the cutter circumferentially with relation to the peripheral surface of the blank, and means under the control of the operator for actuating said differential gear to effect said adjustment.

42. A gear generating machine having, in combination, a work spindle adapted to carry a gear blank, a gear shaped planing cutter, means for imparting a relative reciprocatory cutting movement to the cutter and blank, means for imparting relative rotational movements to the cutter and blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a starting and stopping clutch for the machine, mechanism controlled by liquid pressure for engaging the clutch, a feed mechanism operated by liquid pressure to impart relative feeding movements to the supports, a stop for positively limiting the relative feeding movements of the supports against said liquid pressure to secure a predetermined depth of cut during the continued rotation of the cutter and blank, a source from which liquid is supplied under pressure to said pressure operating mechanisms, and means acting when rendered operative to release the pressure from the system to disengage the clutch and to permit a relative movement of the gear and cutter out of operative engagement.

43. A gear generating machine having, in combination, a work spindle adapted to carry a gear blank, a gear shaped planing cutter, means for imparting a relative reciprocatory cutting movement to the cutter and blank, means for imparting relative rotational movements to the cutter and blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a starting and stopping clutch for the machine, mechanism controlled by liquid pressure for operating the clutch, feed mechanism to impart relative feeding movements to the supports and to maintain said supports in operating relationship comprising a feed member controlled by liquid pressure, a source from which liquid is supplied under pressure, conduits for conveying the liquid under pressure from said source to said control mechanisms, a valve in each of said conduits, separate manually operated members for opening and closing each of said valves, and an additional manually operated member for simultaneously opening or closing both of said valves.

44. A gear generating machine having, in combination, a work support, a gear shaped planing cutter, a cutter carrying spindle, means for actuating the spindle to impart a reciprocating cutting movement to the cutter transversely of the blank on the work support, and means for rotating and guiding the spindle comprising a rotating sleeve, guide blocks fitting within and keyed to the sleeve having their adjacent edges shaped to form grooves between said blocks, flanges on the sleeve to prevent endwise movement of the said blocks with relation thereto, a cooperating guiding sleeve keyed to the spindle and provided with longitudinal outwardly projecting ribs engaging the guideways formed by the guide blocks, and abutting flanges on the spindle for preventing lengthwise movement of the sleeve with relation to the spindle.

45. A gear generating machine having, in combination, a work support, a gear shaped planing cutter, a cutter carrying spindle, means for actuating the spindle to impart a reciprocating cutting movement to the cutter transversely of the blank on the work support, and means for rotating and guiding the spindle comprising a rotating sleeve, guiding blocks fitting within the sleeve having their adjacent edges shaped to form grooves between said blocks, means for removably clamping the guiding blocks to the sleeve, a cooperating guiding block sleeved on the spindle provided with longitudinal outwardly projecting ribs engaging corresponding guideways formed by the guide blocks secured to the sleeve, and means for removably securing said guide block to the spindle.

46. A gear generating machine having, in combination, a work spindle adapted to carry a gear blank, a gear shaped planing cutter, a cutter spindle, means for imparting a rotative reciprocatory cutting movement to the cutter and the blank, driving connections for imparting relative rotational movements to the cutter and work spindles arranged to maintain a substantially equal peripheral speed of the cutter and blank at the point of cutting contact, supports on which said spindles are mounted relatively movable laterally of said cutting movements to bring the cutter and gear blank into and out of operative engagement, a rotatable member forming an intermediate link in the connections for rotating one of said elements, a pinion rotatably mounted on said member, a driving and a driven gear mounted concentrically with said member to mesh with said pinion and having a differential ratio relatively to each other, and means under the control of the operator for rotating said member relatively to said gears to secure a differential adjustment of the peripheral surface of the cutter circumferentially with relation to the peripheral surface of the blank.

47. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a starting and stopping clutch for the machine, mechanism controlled by liquid pressure for operating the clutch, a feed mechanism operated by liquid pressure to impart relative feeding movements to the supports and to maintain said supports in operating relationship during the progress of the cutting operation about the blank, a source from which liquid is supplied under pressure to said pressure operated mechanisms and timing mechanism acting automatically after a complete revolution of the cutting operation about the gear blank at depth to exhaust the pressure to relatively move the cutter and gear blank out of operative engagement.

48. A gear generating machine having, in combination, a work spindle adapted to carry a gear blank, a gear shaped planing cutter, means for imparting a relative reciprocatory movement to the cutter and blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a feed mechanism operated by liquid pressure to impart relative feeding movements to the supports, a stop mechanism arranged to arrest the relative feeding movements of the cutter and blank against said liquid pressure in a plurality of different positions to secure different depths of cut, means acting to secure a plurality of preliminary and final cuts, and a timing mechanism acting automatically after the completion of each preliminary cut around the gear blank to actuate said stop mechanism to permit a continued relative feeding movement of the cutter and blank.

49. A gear generating machine, having, in combination, a work spindle adapted to carry a gear blank, a gear shaped planing cutter, means for imparting a relative reciprocatory cutting movement to the cutter and blank, means for imparting relative rotational movements to the cutter and blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a starting and stopping clutch for the machine, mechanism controlled by liquid pressure for operating the clutch, feed mechanism to impart relative feeding movements to the supports and to maintain said supports in operating relationship comprising a feed member controlled by liquid pressure, a source from which liquid is supplied under pressure, conduits for conveying the liquid under pressure from said source to said control mechanisms, a valve in each of said conduits, and means acting automatically after a complete revolution of the cutting operation around the gear blank at depth to shut off both valves to disengage the clutch and permit a relative movement of the cutter and blank to inoperative position.

50. A gear generating machine having, in combination, a work spindle adapted to carry a gear blank, a gear shaped planing cutter, means for imparting a relative reciprocatory cutting movement to the cutter and blank means for imparting relative rotational movements to the cutter and blank adapted to maintain a substantially equal peripheral speed at the point of cutting contact, supports on which the work spindle and cutter are mounted relatively movable laterally of said cutting movements to bring the cutter and gear blank into and out of operative engagement, a liquid pressure control system for controlling the operation of the machine including a starting and stopping clutch for the machine, mechanism controlled by liquid pressure for operating the clutch, feed mechanism to impart relative feeding movements to the supports and to maintain said supports in operating relationship comprising a feed member controlled by liquid pressure, a source from which liquid is supplied under pressure, conduits for conveying the liquid under pressure from said source to said control mechanisms, a valve in each of said conduits, separate manually operated members for opening and closing each of said valves, an additional manually operated member for simultaneously opening and closing both of said valves, and means acting automatically after a complete revolution of the cutting operation about the blank at depth to close both of said valves.

51. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system for controlling the feeding movements of one of said supports relatively to the other comprising a relatively rotatable screw and nut threaded thereon, a fluid operated piston for imparting rotational movements to one of said screw and nut elements to impart a relative lengthwise feeding movement thereto, a source from which liquid pressure is supplied to said piston, and a stop for positively limiting the rotational movement of said rotated element to arrest and to maintain said feeding elements in position for a predetermined depth of feed during the continued rotation of the cutter and blank.

52. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system for controlling the feeding movements of one of said supports relatively to the other comprising relatively rotatable screw and nut feeding elements, mechanism operated by fluid pressure for rotating one of said elements to impart a relative longitudinal feeding movement thereto, and a stop for positively limiting the rotational movement of said rotated element to arrest and to maintain said feeding elements in position for a predetermined depth of feed during the continued rotation of the cutter and blank.

53. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system for controlling the feeding movements of one of said supports relatively to the other comprising a relatively rotatable screw and nut threaded thereon, a fluid operated piston for imparting rotational movements to one of said screw and nut elements to impart a relative lengthwise feeding movement thereto, a source from which liquid pressure is supplied to said piston, means for controlling the application of the fluid pressure to said piston to determine the rate of feed, and a stop for positively limiting the rotational movement of said rotated element to arrest and to maintain said feeding elements in position for a predetermined depth of feed during the continued rotation of the cutter and blank.

54. A gear generating machine having, in combination, a work spindle adapted to carry a gear blank, a gear shaped planing cutter, means for imparting a relative reciprocatory cutting movement to the cutter and the blank, means for imparting relative rotational movements to the cutter and the blank adapted to maintain a substantially equal peripheral speed at the point of cutting contact, supports on which the work spindle and cutter are mounted relatively movable laterally of said cutting movements to bring the cutter and gear blank into and out of operative engagement, and a fluid pressure control system for controlling the feeding movement of one of said supports relatively to the other comprising relatively rotatable screw and nut feeding elements, a fluid pressure operated piston connected to rotate one of said feeding elements to impart a relative longitudinal feeding movement thereto, a stop for positively limiting rotation of said rotated element against said fluid pressure to determine the depth of feed, means tending to rotate said feed member in an opposite direction to separate the cutter and blank, and a control valve for controlling the application of said fluid pressure to feed and to maintain said rotatable feed element in the operating position controlled by the stop, and upon exhausting the pressure to permit the separation of the work and cutter.

SAMUEL W. AVIS.